United States Patent [19]

Yasutomi et al.

[11] Patent Number: 5,378,417
[45] Date of Patent: Jan. 3, 1995

[54] PROCESS FOR PRODUCING CERAMIC COMPOSITIONS

[75] Inventors: Yoshiyuki Yasutomi, Katsuta; Kousuke Nakamura; Hideki Kita, both of Hitachi; Masahisa Sobue, Mito, all of Japan

[73] Assignee: Hitachi, Ltd., Tokyo, Japan

[21] Appl. No.: 411,330

[22] Filed: Sep. 22, 1989

Related U.S. Application Data

[62] Division of Ser. No. 179,984, Apr. 11, 1988, abandoned.

[30] Foreign Application Priority Data

Apr. 10, 1987 [JP] Japan ................... 62-86871
May 8, 1987 [JP] Japan ................... 62-110556
Aug. 20, 1987 [JP] Japan ................... 62-206698

[51] Int. Cl.$^6$ ............................................. C04B 35/58
[52] U.S. Cl. ........................................ 264/61; 264/60; 264/63; 264/65
[58] Field of Search .................. 264/60, 61, 63, 65

[56] References Cited

U.S. PATENT DOCUMENTS 4,579,699 4/1986 Verzemnieks ................ 264/43
4,719,151 1/1988 Chyung ........................ 428/428

FOREIGN PATENT DOCUMENTS 0107349 5/1984 European Pat. Off. .
0181208 11/1985 European Pat. Off. .
0209320 7/1986 European Pat. Off. .
2084703 11/1971 France .
50-84936 7/1975 Japan .
55-100421 7/1980 Japan .
55-116665 9/1980 Japan .
58-88169 5/1983 Japan .
58-140375 8/1983 Japan .
60-44990 3/1985 Japan .
60-60983 4/1985 Japan .
61-163174 7/1986 Japan .
61-201662 9/1986 Japan .

OTHER PUBLICATIONS

Japanese Publication–"Kogyo Zairo", vol. 31, No. 12, pp. 139–146.
European Search Report, Application No. EP88105644, Dated Jul. 18, 1988.

Primary Examiner—James Derrington
Attorney, Agent, or Firm—Fay, Sharpe, Beall, Fagan, Minnich & McKee

[57] ABSTRACT

Disclosed is a ceramic composite which comprises particles of at least one inorganic compound selected from the group consisting of a carbide, a nitride, an oxide, a boride, a silicide and an oxy-nitride and particles and whiskers of $Si_3N_4$, $Si_2N_2O$ or $SiO_2$. This ceramic composite is small in volume change on sintering, and provides heat resistance. In addition, the composite can absorb thermal shock by its voids. It can be used in association with ceramic heaters, current collectors, commutators for starter motors and alternators, and in other areas.

13 Claims, 10 Drawing Sheets

FIG. I(A)
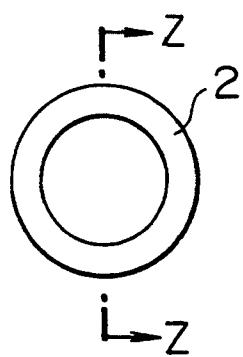
FIG. I(B)
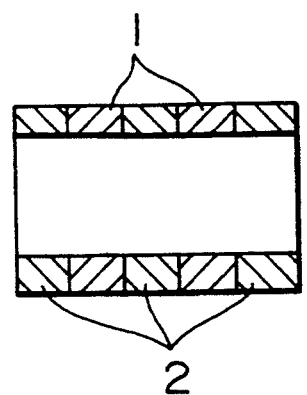
FIG. 3(A)
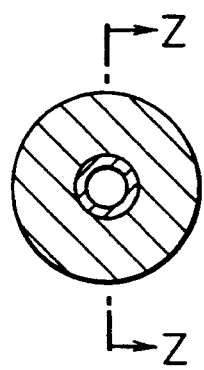
FIG. 3(B)
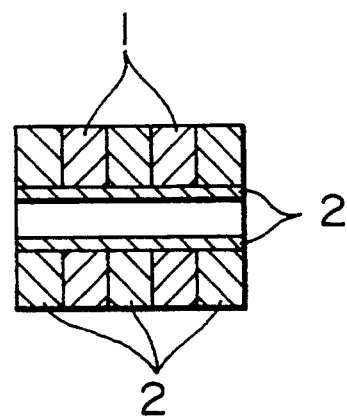
FIG. 4
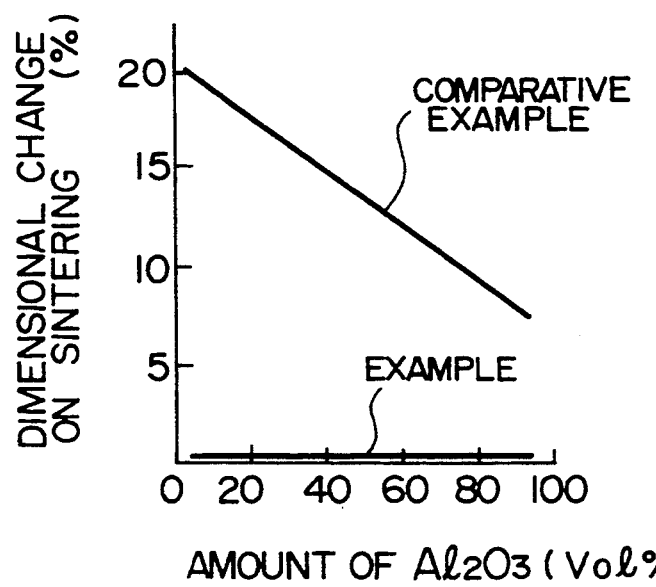

F I G. 2
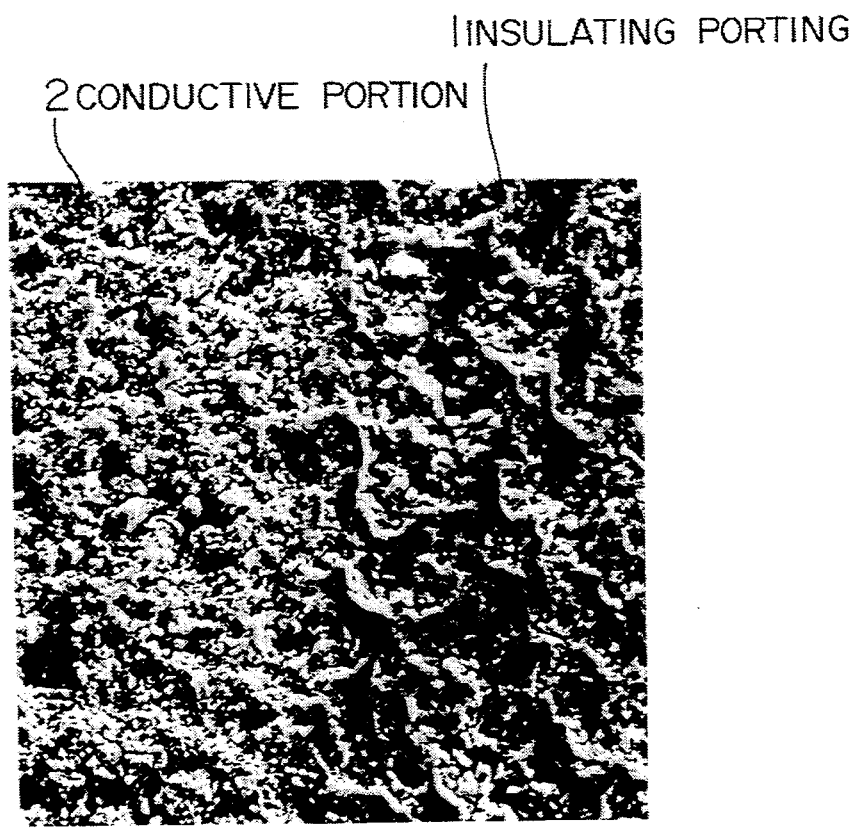
1 INSULATING PORTING
2 CONDUCTIVE PORTION
F I G. 15
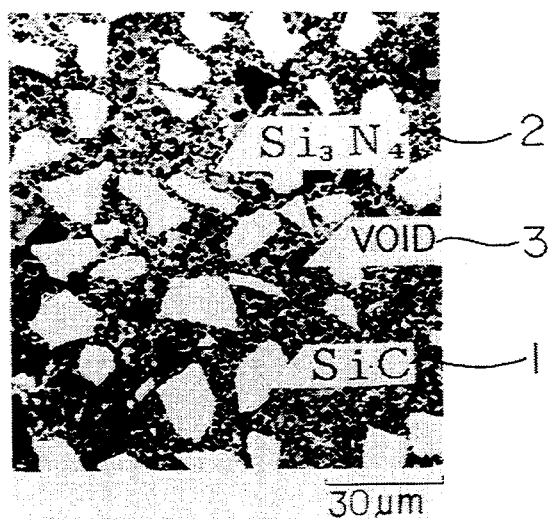

F I G. 16
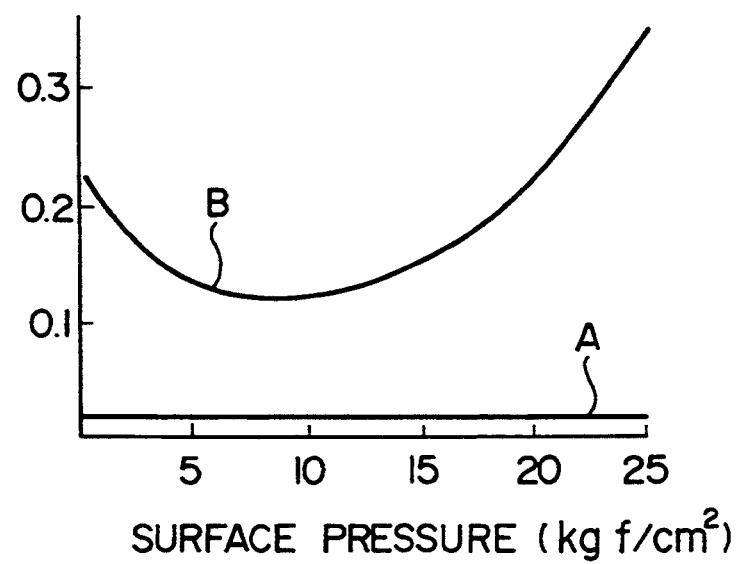

PROCESS FOR PRODUCING CERAMIC COMPOSITIONS

This is a divisional of co-pending application Ser. No. 179,984 filed on Apr. 11, 1988 now abandon.

BACKGROUND OF THE INVENTION

1. Field of the Invention

This invention relates to a ceramic composite comprising particles of an inorganic compound and particles and whiskers of silicon nitride, silicon oxynitride and silicon oxide, and to a process for producing the ceramic composite. Further, this invention relates to an electric conductor, heater and sliding material comprising the ceramic composite.

2. Description of Related Art

Ceramics to be used as a conducting material, structural material or other material have recently been required to have properties of high strength at high temperatures, high toughness, high thermal shock resistance and high accuracy of dimension. Such ceramics are known to include inorganic compounds such as carbides, nitrides, oxides, borides, silicides and oxynitrides. For example, silicon nitride, silicon carbide, alumina and zirconia are known inorganic compounds used in making ceramics. Each of these ceramic materials is rarely used by itself in order to achieve the excellent properties mentioned above. Therefore, many proposals have been made to achieve such properties by selecting combinations of the ceramic materials, and changing the design of the structure.

Hitherto, heaters have been comprised of metal or ceramic. The metal heater includes nichrome or tantalum. This heater has poor heat resistance and degrades at a temperature of 1,000° C. or higher.

Ceramic heaters are generally comprised of materials including silicon carbide, stabilized zirconia, lanthanchromite, molybdenum silicide and the like. These ceramic materials have a relatively high electric resistance, and thermorunaway easily occurs. It is difficult to control the temperature in such heaters since the ceramic materials from which they are made have a negative resistance-temperature coefficient. Furthermore, these ceramic materials are defective in that they are poor in mechanical strength and thermal shock resistance. Therefore, attempts have been made to substitute new electrically conductive ceramics for the above-mentioned ceramic materials.

For example, Japanese Patent KOKAI (Laid-Open) No. 57-41796 describes that SiC or $Si_3N_4$ is mixed with an electrically conductive compound and subjected to hot press sintering to eliminate the problems or defects mentioned above. The hot press sintering method, however, makes it possible to densify sintered bodies. The problem with such a method is that, since a great amount of energy is required for production, production costs are high.

As described in Japanese Patent KOKAI (Laid Open) No. 60-44990, an electrically conductive ceramic enveloped with an electrically insulating ceramic is sintered by hot pressing. A great amount of energy is required. Further, the hot pressing makes it impossible to mold and sinter products having a complicated shape. Generally, to integrate and sinter two or more ceramics having electric resistances which differ from one another, their coefficients of thermal expansion must be adjusted. Hot pressing, however, is carried out at such high temperatures that a small difference in the coefficient of thermal expansion makes it easy for cracks to form.

Furthermore, Japanese Patent KOKAI (Laid-Open) No. 60-60983 discloses a process in which an electrically conductive material is mixed with $Si_3N_4$ particles. The mixture is sintered by pressureless sintering. In this process, a sintering aid is used and hence softening or deformation takes place inconveniently at high temperatures. Further, a volume shrinkage of about 40 to 60% is brought about on sintering to induce deformation of sintered bodies. On the other hand, the sintering of the conductive material and $Si_3N_4$ particles in the absence of any sintering aid do not improve the density of the sintered bodies and, therefore, the specific resistance of the bodies is inconveniently high. Thus, the electrically conductive product according to this Patent KOKAI has unsatisfactory performance.

The Japanese Patent KOKAI references above do not take any account of shrinkage of molded bodies on sintering. Therefore, shrinkage is brought about in these references.

Generally, SiC, $Si_3N_4$ or the like are known as engineering ceramics suitable for a structural material for engines or turbines. These ceramics are excellent in heat resistance, and they are sintered by pressureless sintering, pressure sintering or reaction sintering. With the pressureless sintering and pressure sintering, a rate of dimensional change before and after sintering is 15 to 20%. Thus, these sintering techniques provide deformation and poor accuracy of dimension. On the other hand, it is known that the reaction sintering technique provides a lower rate of dimensional change than that of the other sintering techniques. Nevertheless, the rate is as high as about 1 to 1.5%, as shown in Japanese Patent KOKAI (Laid-Open) No. 58-140375.

As a material having a low rate of dimensional change, a bonded $Si_3N_4$ product has been used as a refractory material. Such material has a mechanical strength of only about 50 MN/m2, as shown in Japanese Patent KOKAI (Laid-Open) No. 58-88169, and is not suitable as a structural material.

Furthermore, Japanese Patent KOKAI (Laid-Open) No. 61-201662, which has been filed by the present applicant, discloses that a fully satisfactory rate of dimensional change on sintering can be obtained, but a body having a complicated shape is not obtained due to poor flowability of starting mixture. Further, the resultant sintered body has an insufficient mechanical strength.

Some of the reasons for the lack of popularity of engineering ceramics are that the rate of dimensional change on sintering is high and sintered bodies are hardly workable due to their high hardness and brittleness. There has never been a practical process for producing a ceramic material having a high strength, low rate of dimensional change and high accuracy of dimension.

On the other hand, ceramic material has been used as a sliding material for sealing because it has an excellent resistance to thermal shock.

Generally, the working of a machine is always accompanied with sliding. Reduction of friction and wear will induce energy savings and will increase the life of a sliding material. For example, a floating seal comprising O-ring 4 and sealing elements 5 and 6 as shown in FIG. 17, has been used as a sealing means for cars or construction machines. In this means, one of these sealing elements is fixed, and the other is rotated in contact with the fixed element at the sliding surface 7 thereof and set through a lubricant 8 in a floating state with respect to an axis 9, thereby keeping the sealing property of time means. Therefore, this means is most suitable for sealing or protecting from earth and sand. However, since it is made of a cast iron material, this floating seal performs poorly with respect to both heat resistance and wear resistance. Another sealing means exists wherein one of the sealing elements 10 is made of Cr cast iron and the other 11 is made by injection molding. This sealing means also has the same defect as mentioned above.

On the other hand, a ceramic-made sliding means has recently been introduced. Typical examples of the ceramics used for the sliding means include SiC, $Si_3N_4$, $Al_2O_3$ or $ZrO_2$. Practically, it is required that the sliding material have the following properties (see "Kogyo Zairyo", Vol. 31, No. 12, pp. 139–146, particularly 140):

(1) a high hardness and an excellent resistance to wearness and seizing:

(2) a good affinity to a sliding partner (a low coefficient of friction and a small amount of the partner worn):

(3) a good corrosion resistance;

(4) a high strength, toughness and resistance to thermal shock;

(5) a small amount of deformation by stress and/or heat at sliding surfaces to keep a good lubrication state on the sliding surfaces (i.e., a high Young's modulus and a small coefficient of thermal expansion);

(6) a high thermal conductivity (The increase of the coefficient of friction and thermal deformation on the sliding surfaces are prevented by increasing the resistance to thermal shock and inhibiting the accumulation of frictional heat.); and (7) a low specific gravity (centrifugal stress is reduced).

These required properties are not all satisfied by known materials. For example, a metallic material is questionable with respect to resistance to seizing. $Al_2O_3$ itself has a low resistance to thermal shock, and since it has a high coefficient of thermal expansion, it is easily deformed by heat on the sliding surfaces thereof. $ZrO_2$ itself also has a low resistance to thermal shock and a high coefficient of thermal expansion. $Si_3N_4$ itself has a low thermal conductivity. SiC alone has a high hardness and high thermal conductivity but has a poor resistance to thermal shock. A sliding material having both excellent wear and corrosion resistance, as well as conspicuously improved resistance to thermal shock, has been demanded by the industry.

Among these sliding materials, SiC is widely used in a sintered form. For example, Japanese Patent KOKAI (Laid-Open) No. 61-163174 discloses "a sliding material comprising an SiC sintered porous body having an excellent sliding property under wet conditions". Also, Japanese Patent KOKAI (Laid-Open) No. 55-100421 discloses "a sliding means comprising a fixed part and rotating part, any one of the parts being made of $Si_3N_4$ and the other made of SIC".

However, none of these Japanese Patent KOKAI references direct any attention to thermal shock resistance and one-side contact.

Thus, the prior art materials have no combination of good wear resistance and thermal shock resistance. Further, prior art materials have drawbacks such as cracks that are generated due to a rapid change of temperatures. Finally, the prior art materials can be worn.

SUMMARY OF THE INVENTION

The objects of the present invention are to eliminate the defects or drawbacks as described above.

The present invention incorporates the following three aspects:

First Aspect

One object of the present invention is to provide a ceramic composite containing two or more layers having different electrical resistances formed by near net shaping.

Another object of the present invention is to provide a ceramic composite further having a very small rate of dimensional change on sintering molded bodies.

A further object of the present invention is to provide a current collector ring for revolving electric machines, made from the ceramic composite.

Second Aspect

An object of the present invention is to provide an engineering ceramic composition suitable for near net shaping with a high accuracy of dimension. Another object of the present invention is to provide a ceramic sintered body which does not require any machining and has a small rate of dimensional change on sintering, high high-temperature strength and good resistance to thermal shock. Further, the composition has a good flowability in molding.

Third Aspect

An object of the present invention is to provide a sliding and sealing means having a good wear resistance, corrosion resistance and thermal shock resistance. The amount of wear on the sliding partner will also be reduced.

BRIEF DESCRIPTION OF THE DRAWINGS

FIGS. 1(A) and 1(B) are schematical cross-sectional views of one embodiment according to the FIRST ASPECT of the present invention.

FIG. 2 is a micrograph of crystal grains of the sintered body comprising a conductive portion and an insulating portion of a ceramic composite according to the FIRST ASPECT of the present invention.

FIGS. 3(A) and 3(B) are schematical cross-sectional views of another embodiment according to the FIRST ASPECT of the present invention.

FIG. 4 is a graph which shows the relation between contents of TiN and $Al_2O_3$ and dimensional change on sintering in the FIRST ASPECT of the present invention.

FIG. 15 is a micrograph of ceramic composition of a sliding surface in an example of the THIRD ASPECT of the present invention.

FIG. 16 is a graph which shows the relation between surface pressure and coefficient of friction in time THIRD ASPECT of the present invention.

DETAILED DESCRIPTION OF PREFERRED EMBODIMENTS

First Aspect

Figure 5:
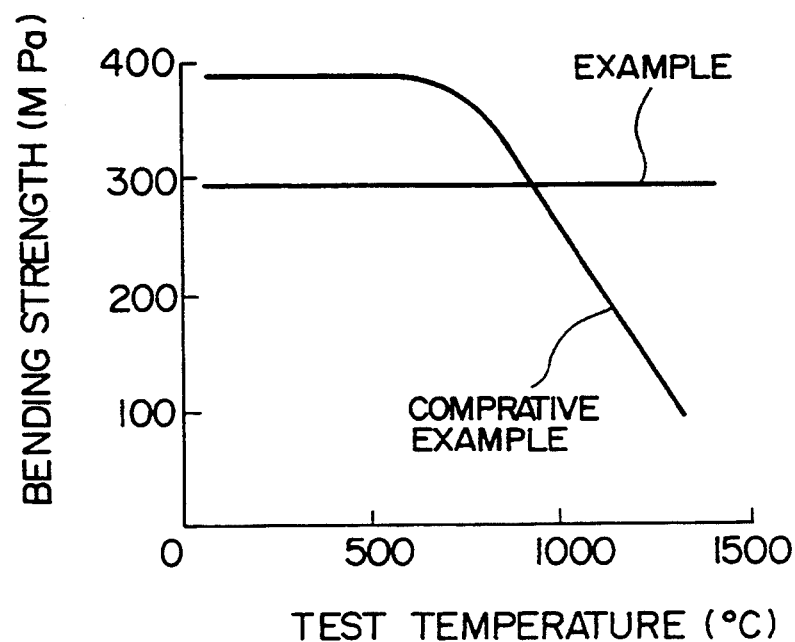
FIG. 5 is a graph which shows the relation between bending strength and temperature in the FIRST ASPECT of the present invention.

The ceramic composite of the present invention is one prepared by integral molding and integral sintering ceramics which differ in electric resistivity in order to bond with particles or whiskers of at least one of $Si_3N_4$, $Si_2N_2O$, and $SiO_2$ produced from metallic Si or ferro-Si.

In the ceramic composite of the present invention, ceramics that are 1) contiguous to each other, 2) different: in electrical resistivity, and 3) electrically conductive compounds for changing the resistivity are non-oxide type conductive materials which are nitrides, carbides, borides and silicides of substances of Groups IIIa, IVa, Va, VIa and VIII of the periodic table and preferred are TiN, TiC, $Ti_2$, $TiSi_2$, ZrN, ZrC, $ZrB_2$, $ZrSi_2$, HfN, HfC, TaN, TaC, $TaB_2$, $TaSi_2$, $Mo_2N$, $Mo_2C$, MoB, $Cr_2N$, $Cr_3C_2$, CrB, $CrSi_2$, NbN, NbC, $NbSi_2$, VN, VC, WC and $WSi_2$. TiN, TiC, ZrN, ZrC, $Cr_2N$ and $Cr_3C_2$ are especially suitable and perform well with respect to oxidation resistance.

The content of electrically conductive particles in sintered bodies which are used for decreasing electrical resistivity in the present invention is preferably 80 vol % or less. If the content is more than 80 vol %, characteristics of ceramics such as mechanical strength, thermal shock resistance and oxidation resistance decrease.

In the present invention, electrical resistivity of sintered bodies can be optionally changed by changing content of conductive particles in the sintered bodies in the range of 5-80 vol %. Furthermore, the resistivity in the range of $10^{14}$ Ω cm $- 10^{-5}$ Ω cm can be optionally obtained by including electrically insulating particles in the sintered body.

In the ceramic composite of the present invention, conductive particles or insulating particles are bonded with at least one of $Si_3N_4$, $Si_2N_2O$ and $SiO_2$ produced from metallic Si or ferro-Si. The volume change on sintering is small and no deformation occurs. Further, two layers different in electrical resistivity are bonded with $Si_3N_4$, $Si_2N_2O$ or $SiO_2$ produced from metallic Si or ferro-Si. The bonded interface, like the body, is superior in heat resistance and thermal shock resistance.

The sintered bodies of the present invention preferably have a void content of 5-40%. When void content exceeds 40%, mechanical strength decreases and resistivity is difficult to reduce. When it is less than 5%, permeation resistance of nitriding gas or oxidizing gas, with which metallic Si or ferro-Si reacts, is increased. This makes it difficult to obtain good sintered bodies. The reason for this result rests in the fact that in order for a conductive compound or insulating compound, metallic Si or ferro-Si to react with nitriding gas or oxidizing gas to form $Si_3N_4$, $SiO_2$ or $Si_2N_2O$ phase to bond the insulating compound or conductive compound, voids are needed for permeation of said gas through molded body.

Presence of 5-40% voids in a sintered body causes relaxation of strain produced due to differences in the thermal expansion coefficient of the layers that have different electrical resistivity. Thus, formation of cracks can be prevented.

It is preferred that metallic Si or ferro-Si has an average particle size of 5 μm or less. When the size exceeds 5 μm, nitriding requires large amounts of time. Also, Si remains.

In the present invention, thermoplastic resins such as polyvinyl butyryl and polyethylene and organosilicone high molecular compounds such as silicone imide compounds and polysilane compounds may be used as molding binders. These binders are preferably added in amounts of 2-20 parts by weight in order to adjust the relative density of the molded body to 60% or higher.

In the present invention, a molded body is heated to 1350° C. or higher in a nitriding gas, oxidizing gas or an oxidizing and nitriding gas atmosphere such as nitrogen, ammonia and oxygen (if necessary, gases such as hydrogen, argon, helium and carbon monoxide may be included).

Commercially available metallic Si, ferro-Si, insulating compounds and conductive compounds may be used. Preferably, the materials should be pulverized into round particles by a mill.

In the case where whiskers are previously mixed with and dispersed in raw materials, all whiskers are not bonded to particles and remain between particles of sintered body. In the present invention though, particles and whiskers are bonded by needle-like whiskers produced from particles in the molded body. These needle-like whiskers cross nearly straight in the spaces between particles. This contributes greatly to the high thermal shock resistance and strength.

According to the present invention, spaces between particles and/or whiskers of the insulating compound and conductive compound are bonded three-dimensionally with whiskers produced from Si particles in the molded body. There are few whiskers in an unbonded state. Thus, sintered bodies of high toughness and high-temperature strength can be obtained.

The average particle size of the insulating compound and the conductive compound is preferably 100 μm or less. When it is more than 100 μm, the strength of the sintered body is reduced. When previously produced whiskers of time insulating compound or the conductive compound are used, an average aspect ratio of 2-50 and length of 0.2-100 μm is desirable. When the aspect ratio is less than 2 and length is less than 0.2 μm, they do not function as whiskers. When the aspect ratio is more than 50 and the length is more than 100 μm, mixing of raw materials becomes difficult and dispersibility is inferior.

In the present invention, the ceramic composite contains whiskers in an amount of 1-70 vol % (preferably 10-30 vol %) per particles and whiskers produced in sintered body. Outside this range, effects of the present invention cannot be obtained.

The molding method is selected from injection molding, casting, rubber press molding, extrusion molding, metal mold molding and the like depending on shape and required characteristics.

After removal of molding aid and the like, the molded body is subjected to heat treatment for formation of whiskers.

Particles or whiskers produced from metallic Si or ferro-Si are most preferably of $Si_3N_4$.

Among the conductive compounds used in the present invention, silicides and borides react with nitrogen nitriding gas. This results in cracks in the sintered body if sintering time is not proper. Therefore, nitrides and carbides are preferred.

Whiskers of $Si_3N_4$, SiC or the like may be blended as raw materials in addition to the whiskers produced from Si particles. However, use of the former whiskers in a large amount causes nonuniformity and is not preferred. Further, whiskers may be used as an insulating compound and a conductive compound.

In order to obtain a void content of less than 5%, it is possible to re-sinter the sintered body. The re-sintering can be effected by hot pressing, hot isotactic pressing or, under normal pressure, utilization of a sintering aid. Thus, whiskers are present three-dimensionally in the sintered body. A ceramic composite of high heat resistance can be obtained. However, the difference in the thermal expansion coefficient must be made as small as possible, so cracks do not occur.

Further, since the sintered body of the present invention has voids, lubricants can be contained in the voids.

In the ceramic composite of the present invention, since the electrically conductive compound and the insulating compound are firmly bonded with particles or whiskers of $Si_3N_4$, $Si_2N_2O$ or $SiO_2$ produced from metallic Si or ferro-Si, volume change on sintering is small. Also, the composite performs well with respect to heat resistance. Further, it has voids and can absorb thermal shock.

Second Aspect

The present invention relates to a method for making ceramics of high strength and high dimensional accuracy which comprises 1) adding a thermoplastic resin as a binder to metallic Si powders or inorganic compound powders containing at least 45 vol % of metallic Si powders, 2) heating and kneading the mixture, 3) subjecting the kneader product to warm pressure molding to form a molded body of at least 70 vol % in volumetric packing of powders (ratio of volume occupied by powders in the molded body), 4) removing the binder in the molded body by heating, and 5) heating and sintering the molded body in a nitriding gas atmosphere to bond particles of $Si_3N_4$ and the inorganic compound with $Si_3N_4$ particles and whiskers produced from said Si.

Furthermore, the present invention relates to a composition for ceramics of high dimensional accuracy which contain metallic Si powders or inorganic compound powders containing at least 45 vol % of metallic Si powders, and a binder of thermoplastic resin, the compound having an apparent viscosity at 150° C. of $(3-90) \times 10^4$ N·s/m².

When the amount of Si powders is less than 45, the dimensional change on sintering cannot be made small, nor can a ceramic sintered body of adequate strength be obtained. In the present invention, the dimensional change on sintering can be made less than 0.2% by adjusting the content of Si powders to at least 45 vol %. Of course, Si content may be 100%.

When volumetric packing of particles in the molded body is less than 70 vol %, a ceramic sintered body of sufficient strength cannot be obtained. By increasing it to at least 70 vol %, a sintered body having a bending strength of about 300 MN/m² or more can be obtained. This is the most effective means for improving strength.

Said inorganic compound is selected from oxides, carbides, nitrides, oxy-nitrides, silicides and borides. The inorganic compound desirably has a melting point or sublimation temperature of 1400° C. or higher.

As for the inorganic compound, mention may be made of, for example, TiN, $Si_3N_4$, $Si_2N_2O$, TiC, $TiO_2$, AlN, $Al_2O_3$, $SiO_2$, ZrN, $ZrO_2$, ZrC, $TiB_2$, $ZrB_2$, $Cr_3C_2$, $Cr_7C_2$, CrB, $Cr_2N$, WC, $W_2C$, $WSi_2$, $TiSi_2$, $ZrSi_2$, $Fe_3C$, VC, VN, $CeC_2$, MgO, $Mo_2N$, $Mo_2C$, MoB, ThC, HfN, HfC, TaN, TaC, $TaB_2$, NbN, BeO, WN, CaO, $TaSi_2$ and $CrSi_2$.

Among these inorganic compounds, silicides and borides react with nitrogen during sintering in a nitriding gas. Hence, cracks might occur in the sintered body if sintering conditions are not proper. Therefore, carbides, nitrides and oxy-nitrides are preferred.

As the metallic Si powders, ferro-Si containing Fe may be used. However, there is the possibility of Fe remaining in the sintered body to cause reduction of high-temperature strength.

Particle size of said Si powders should be 10 μm or less, preferably 1 μm or less. The particle size of the inorganic compound should be 100 μm or less, preferably 20 μm or less. Commercially available powders may be used. Preferably, though, the powders should be pulverized by a mill to round particles.

A part of said inorganic compound powders may be replaced with whiskers. In this case, the amount of whiskers desirable is 55 vol % or less in the sintered body. When the amount is more than 55 vol %, a uniform blend of raw materials cannot be obtained. The whiskers added preferably have an average aspect ratio of 200 or less and an average length of 200 μm or less.

Thermoplastic resins used for preparation of pre-molded bodies for obtaining sintered ceramics may be used as binder resins. Examples thereof are polyvinyl butyryl, polyethylene, polysilicone, and synthetic waxes.

In the present invention, time binder has an important role. Time additional amount thereof is needed to attain a packing of particles of at least 70 vol % in a molded body.

The inventors have made various studies on this point and have found that there is a very close correlation between specific surface area of raw material powders and the additional amount of the binder per 100 parts by weight of said raw material powders. The present invention is based on this finding.

First, the specific surface area S (cm²/g) of raw material powders can be obtained by the following formula:

$$S = \frac{6}{\rho \cdot d}$$

wherein is a density and d is an average particle size (μm).

The relation between said specific surface area and amount B of the binder (part by weight per 100 parts by weight of raw material powder composition) necessary for obtaining a particle packing of molded body of at least 70 vol % is shown by the following formula:

$$B = [(7S/20,000) + 3] \pm 2.5$$

By adding the binder in an amount within the range given by the above formula, particle packing of the molded body can be made at least 70 vol % and a sintered body having a bending strength of about 300 MN/m² or more can be provided.

Raw material composition containing the binder in an amount of the above range has an apparent viscosity of $(3-90) \times 10^4$ N·s/m² as explained hereinafter. By selection of this viscosity range, fluidity at molding can be estimated. Also, a molded body of at least 70 vol % in packing can be obtained. Thus, a composition suitable for near net shaping can be provided.

From the standpoint of fluidity of raw material composition, Si powders of 1 μm or less in particle size are preferred. Also, using blend comprising 15–60% by weight of polyethylene, 30–70% by weight of wax and 5–25% by weight of stearic acid as a binder is preferred.

The raw material composition to which the binder is added is well kneaded and then molded. A molding method is selected from injection molding, press molding, rubber press molding, extrusion molding, powder molding and the like depending on shape and required characteristics. Warm molding is carried out at a higher point than the softening point of binder resin. For example, when a mechanical press is used, molding pressure may be about 1000 kgf/cm².

The resulting molded body is degreased (removal of binder) before sintering. Degreasing is carried out by gradually heating the molded body from room temperature to about 500° C. at about 2° C./h.

This molded body is preferably heated to lower than the melting point of metallic Si (lower than 1410° C.), possibly 1100°–1350° C. in a nitriding gas atmosphere comprising nitrogen and/or ammonia, and if necessary, further comprising hydrogen, argon, helium or the like. A heating rate until sintering temperature is obtained can be 4° C./h. The molded body can be easily sintered by such heating. If necessary, lot pressing may be applied.

Preferably, the sintered body has a void content of 30% or less. When the void content exceeds 30%, strength decreases. The void content of 30% or less can be obtained by adjusting the volumetric packing of particles in the molded body to at least 70 vol %.

Si3N4 whiskers are produced in the sintered body during sintering and such whiskers are preferably contained in an amount of 1–70 vol %, possibly 10–30 vol % for the reaction-produced phase.

The reasons ceramics have small dimensional change (less than about 0.15%) on sintering and have a bending strength of 300 MN/m² or higher are considered as follows.

First, Si3N4 whiskers, produced by sintering in a nitriding atmosphere, take a large part in dimensional change on sintering. This is clear from accompanying FIGS. 8 and 9.

Figure 8:
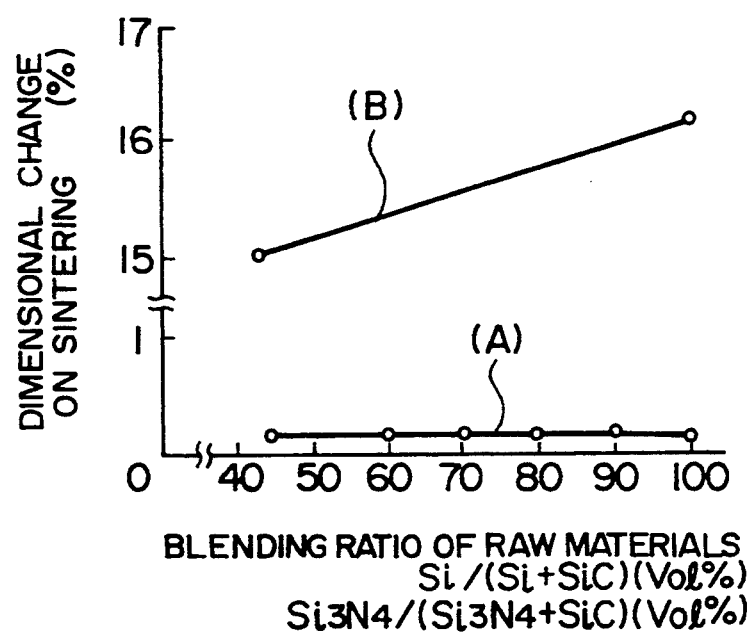
FIG. 8 is a graph which shows the relation between rate of dimensional change on sintering and mixing ratios of raw materials in the SECOND ASPECT of the present invention.
Figure 9:
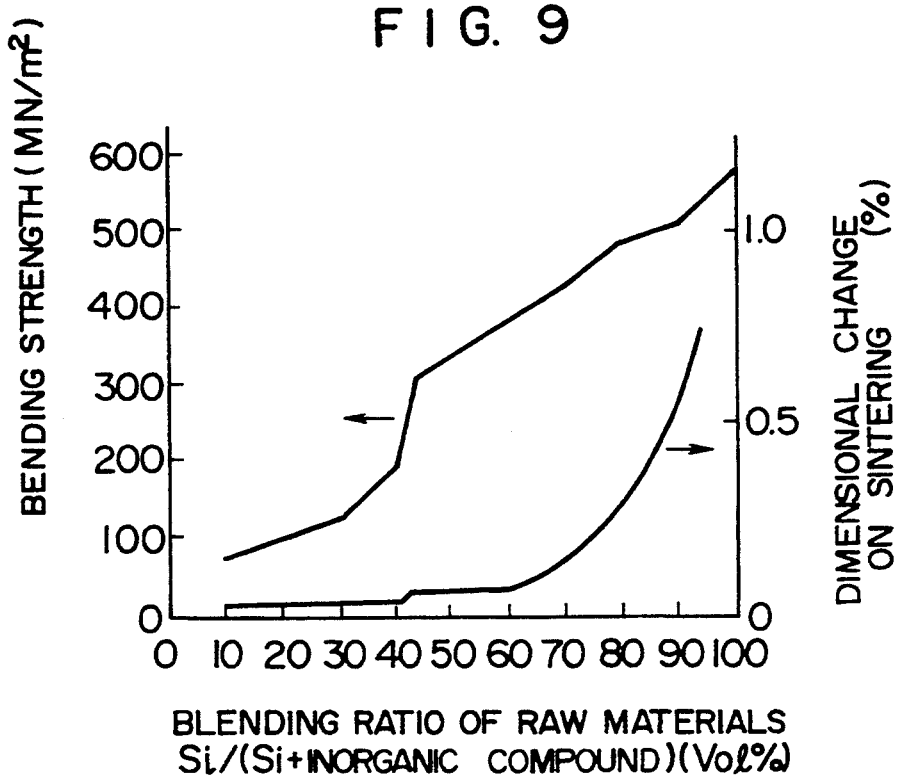
FIG. 9 is a graph which shows the relation among mixing ratios of raw materials [Si/(Si+inorganic compound)], rate of dimensional change on sintering and bending strength in the SECOND ASPECT of the present invention.

FIGS. 8 and 9 show the relation between blending ratio of raw materials [Si/(Si+inorganic compound)] and dimensional change on sintering or bending strength when sintered bodies were produced by adding 9 parts by weight of a thermoplastic resin to a mixture of Si and inorganic compound, heating and kneading the mixture, subjecting it to warm pressure molding, then removing the binder and sintering the molded body in nitrogen gas. With increase in the amount of Si, amount of whiskers of produced Si3N4 increases and strength increases. Dimensional change on sintering increases, but this increase can be practically ignored.

The reason for the above is that time whiskers produced by sintering closely connect the particles of sintered body. That a sintered body having a bending strength of 300 MN/m² is obtained especially when Si is more than 45 vol % is considered to be a result of the increase of such connecting chains.

Figure 10:
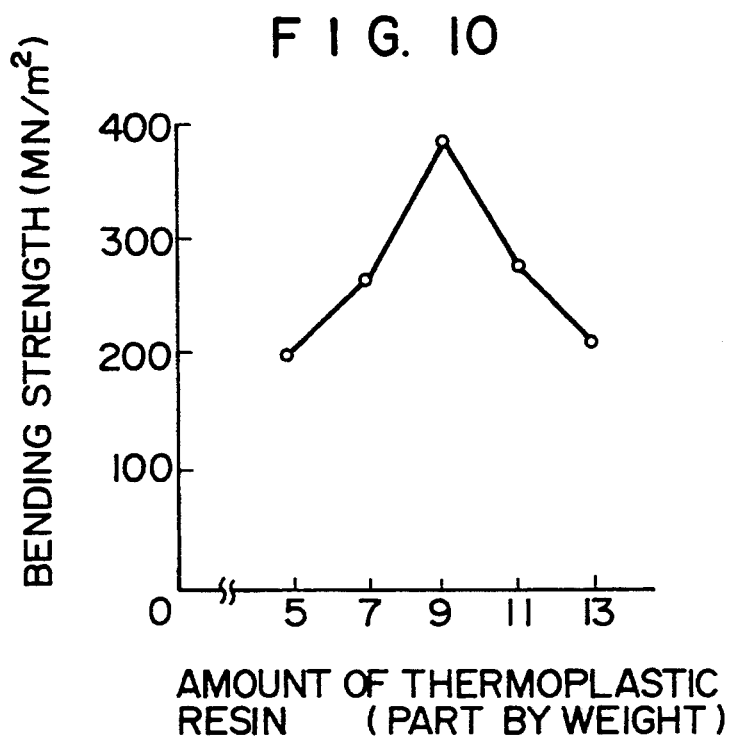
FIG. 10 is a graph which shows the relation between amount of binder resin and bending strength in the SECOND ASPECT of the present invention.
Figure 11:
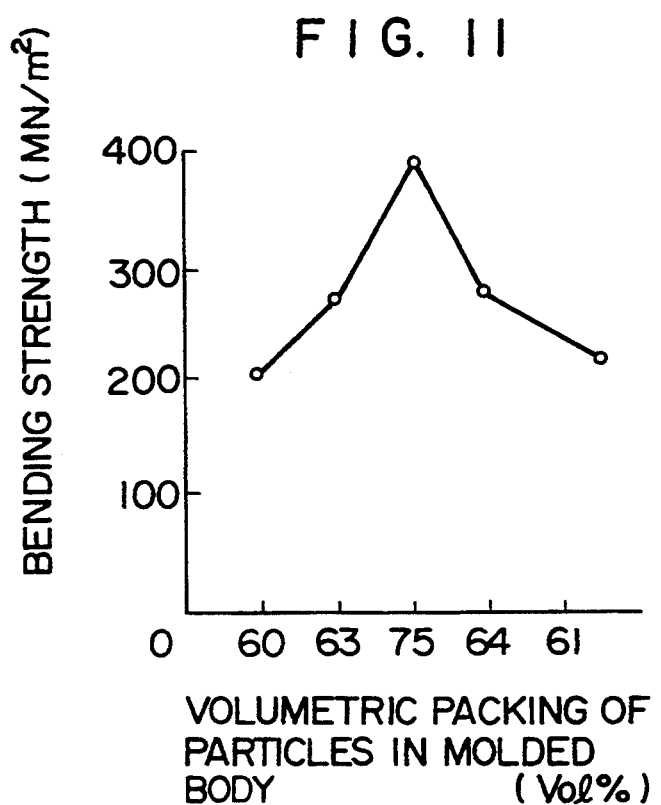
FIGS. 11 and 12 are graphs which show the relation between volumetric particle packing rate of molded bodies and bending strength in the SECOND ASPECT of the present invention.

Next, relation between amount of binder resin and bending strength with amount of Si being 60 vol % is shown in FIGS. 10 and 11. FIGS. 10 and 11 show that the amount of binder resin has a great effect on bending strength. This is influenced by volumetric packing of molded body.

The raw material powder is comprised of fragile solid fine powder particles and is difficult to pack by pressing. Therefore, it is necessary to add binder thereto to accelerate fluidity of powders and to increase strength of molded body. The strength of the sintered body changes depending on the additional amount of binder. As mentioned hereinbefore, this has a relation with volumetric packing of powders of molded body (density). With an increase in the amount of binder, the fluidity of time mixture increases under heating, and pressure molding becomes easy. As a result, volumetric packing of particles of the molded body is improved. However, if a binder is added in an amount that is greater than the vacancy when raw material powders are in ideal dense packing, the raw material powders are isolated in the binder, and fluidity is increased. The solid ratio in the molded body is decreased, though, resulting ill decrease of volumetric packing of particles of the molded body. Thus, the void content of the sintered body increases. This causes a reduction in the strength of the sintered body.

As mentioned before, when the molded body is sintered in a nitriding atmosphere, whiskers produced from Si powders connect particles, fill the vacancy between the particles, and grow three-dimensionally in the sintered body. Thus, ceramics of high toughness can be obtained.

In the ceramics of the present invention, particles in the molded body of at least 70 vol % in volumetric packing of particles are connected by nitride produced from metallic Si powders. Hence, dimensional change on sintering is small, and no deformation occurs.

In the present invention, particles and whiskers produced from metallic Si are preferably nitrides. Oxynitride and oxide tend to decrease high-temperature strength.

According to the present invention, ceramics with less than a 0.2% dimensional change on sintering and with a bending strength of about 300 MN/m² or more can be obtained by near net shaping. Such ceramics require negligible mechanical working after sintering and can be applied to various fields of structural parts such as engines and turbines.

Third Aspect

The present invention relates to a sliding member for sealing wherein one surface of sliding surfaces comprises ceramics composed of SiC and Si$_3$N$_4$, as a composite material. This composite material, S$_3$N$_4$, contains at least one of the following: particles, or whiskers. Said ceramics have void content and the other surface has a hardness less than that of the composite material of said surface.

In the present invention, Si$_3$N$_4$ particles or whiskers for bonding SiC produced by heat treatment of metallic Si are preferred. They bond particles and reduce vacancy between the particles. Thus, sintered bodies having open voids of 2–30% in void content and 100 μm or less in diameter can be obtained.

In the present invention, it is preferred that the average particle size of SiC particles is 100 μm or less, the average aspect ratio of SiC whiskers is 200 μm or less, and the average length of SiC whiskers is 200 μm or less. Outside these ranges, mixing of raw materials is difficult and dispersion is not uniform. This results in a reduction of mechanical strength.

The reason why one surface of the seal sliding member is made of a composite material of SiC and Si$_3$N$_4$ in the present invention is that a sliding material having the characteristics of both the SiC and Si$_3$N$_4$ can be obtained. Unexpectedly good thermal shock resistance can be obtained by bonding SiC, good in wear resistance, hardness and thermal conductivity, with Si$_3$N$_4$, low in thermal expansion coefficient. The reason why another surface is made of a composition having a hardness lower than that of SiC particles and Si$_3$N$_4$ particles of the other sliding surface is that if it is harder than the sliding surface comprising SiC and Si$_3$N$_4$ and voids, SiC and Si$_3$N$_4$ are worn by the harder particles of another surface and fall off between the sliding surfaces to cause wear due to scratch. When materials with compositions having particles of the same hardness are combined and slid, marks are apt to form on the sliding surface. This is because, even if the sliding surface is mirror-polished, the contact is microscopically point or line contact, and the surfaces are in the state of one-side contacting. This naturally forms sliding marks. On the other hand, according to the present invention, another surface is made of a material having a hardness lower than that of SiC and Si$_3$N$_4$ particles, and, as a result, substantially no wear is caused on one surface. Thus, a sliding material superior in wear resistance can be obtained. By employing a material for one sliding surface which is softer than another sliding surface, even if one-side contact occurs, the surface of lower hardness is mirror-polished by the harder surface from sliding. Accordingly, the period of the state of one-side contact is short, and a sliding material superior in sealing property can be obtained.

The reason why one surface of seal sliding surfaces is made of a ceramic sintered body having open voids of 2–30% in void content is that said open voids relax thermal shock strain to provide a sliding material of unexpectedly good thermal shock resistance. When diameter of voids is more than 100 μm and void content is more than 30%, mechanical strength decreases and bonding strength between the SiC and the produced Si$_3$N$_4$ phase decreases. This results in considerable falling-off of SiC and Si$_3$N$_4$ particles during sliding. Further, breakage of lubricant oil film does not occur due to these open voids. Thus, cohesion and scorch are not produced. This is because lubricant oil penetrates into the open voids and oozes out on the sliding surface to give the above effects. Therefore, as far as one surface is made of the ceramics of the present invention, another surface may be of metals, ceramics, carbon or synthetic resins lower in hardness than the particles of said one surface. It has been confirmed by experiments that, when oxide ceramics are used as the partner material (another material) sliding characteristics are improved. This is because SiC and Si$_3$N$_4$ are high in covalent bonding. When the amount of adsorbates on the surface decreases, cohesion is apt to occur. However, if the partner surface is made of oxide, an oxygen ion is produced on the sliding surface to produce surface adsorbates which prevent the cohesion.

In the present invention, in case SiC contained in ceramics composed of SiC, Si$_3$N$_4$ and voids is greater than time particles or whiskers of Si$_3$N$_4$ or the like produced from metallic Si powders, the material is better in wear resistance and thermal shock resistance. Especially, because of composite ceramics, thermal shock resistance is superior to that of other ceramics having the same void content.

The characteristics are further improved when a solid lubricant or resin, such as furan resin, is contained in the void of a sintered body.

According to the present invention, one surface of the sliding surfaces of the sliding member for sealing is made of ceramics composed of at least one of either particles or whiskers of SiC and Si$_3$N$_4$, and voids. The outer surface (partner surface) is made of a material having a hardness lower than that of the particles or whiskers of Si$_3$N$_4$ of said one surface, whereby excellent wear resistance, corrosion resistance and thermal shock resistance can be obtained. The wear of a partner material can be reduced. Hence, performance of various seals can be markedly improved.

As explained hereinabove, according to the present invention, the sliding members have excellent sliding properties such as wear resistance and thermal shock resistance. So, endurance and reliability of the seal can be remarkably improved. This is effective for various sliding mechanisms such as mechanical seals, floating seals, plain bearings and the like.

EXAMPLE 1

To 100 parts by weight of a raw material comprising 22.7 wt. % of metallic Si powder 0.9 μm in average particle size, and 77.3 wt. % of TiN powder of 1.2 μm in average particle size, was added 9 parts by weight of binder comprising polyethylene based thermoplastic resin and stearic acid. The mixture was kneaded at 160° C. for 12 hours by a pressure kneader. The kneaded product was pulverized to 10 meshes or less to obtain a raw material for electrical conductor ceramics A.

To 100 parts by weight of raw material comprising 38 wt. % of metallic Si powder of 0.9 μm in average particle size and 62 wt. % of Al$_2$O$_3$ of 2 μm in average particle size was added 9 parts by weight of a binder comprising a low-density polyethylene, a synthetic wax and stearic acid. The mixture was kneaded at 160° C. for 12 hours by a pressure kneader. The kneaded product was pulverized to 10 meshes or less to obtain a raw material for insulant ceramics B.

Then, the raw materials for ceramics A and B were filled in succession in a mold at 160° C. and under 1000 kg/cm² to obtain a layered ring as shown in FIG. 1(A) and FIG. 1(B). FIG. 1(B) is a cross-sectional view of FIG. 1(A) at Z—Z. This molded ring was 1) heated to 500° C. at 3° C./h to remove the binder therein 2) heated to 1100° C. at 5° C./min in a nitrogen atmosphere, and, 3) heated from 1100° C. to 1350° C. at 4° C./h to obtain a sintered body having whisker/particle of $Si_3N_4$ of 1/9.

The ratio of whisker/particle can be adjusted by changing the rate of heating of from 1100° C.–1400° C. and retaining stepwise the temperature during the heating. The ratio of whisker/particle can be obtained by observation of the sintered body under a scanning electron microscope and a transmission electron microscope. The characteristics of the obtained sintered body are shown in Table 1. Rate of dimensional change when the molded product was sintered was small, namely, ±0.2. No cracks occurred. Resistivity of the portion of ceramics A was $9 \times 10^{-4}$ Ω cm and that of the portion of ceramics B was $7 \times 10^{13}$ Ω cm. FIG. 2 shows an electron micrograph of the boundary between the conductive portion and the insulating portion. It can be seen that the conductive portion and the insulating portion were firmly bonded. This bonding is due to $Si_3N_4$ produced from metallic Si.

TABLE I

| Example | Ceramics | Composition of sintered body (vol %) | | | Void (%) | Resistivity (Ω cm) | Bending strength (MPa) |
| --- | --- | --- | --- | --- | --- | --- | --- |
| | | $Si_3N_4$ | TiN | $Al_2O_3$ | | | |
| 1 | A | 40 | 60 | — | 22 | $9 \times 10^{-4}$ | 280 |
| | B | 50 | — | 50 | 18 | $7 \times 10^{13}$ | 270 |

The coefficient of thermal expansion of the conductive portion was $5.2 \times 10^{-6}$° C.$^{-1}$ and that of the insulating portion was $5.1 \times 10^{-6}$° C.$^{-1}$. This also indicates superior thermal shock resistance of the sintered body.

EXAMPLES 2–36

Sintered bodies were prepared in the same manner as in Example 1 except that the conductive particles were used in place of TiN particle. The results are shown in Table 2. The composition of the sintered bodies is not shown in Table 2 because the composition of insulating portion B of the sintered body was $Si_3N_4:Al_2O_3=50:50$ (vol %) as in Example 1.

Rate of dimensional change of from molded product to sintered body was small, namely, less than +0.2%. No cracks occurred. Conductive portion A and insulating portion B were firmly bonded at their boundary as in Example 1.

Furthermore, integral molding and sintering with optional combination of resistivity of from $10^{14}$ Ω cm to $10^{-5}$ Ω cm are made possible by allowing a conductive compound and an insulating compound to be present together.

TABLE 2

| No. | Raw material ratio (wt. %) | | Void content (%) | Resistivity (Ω cm) | Bending strength (MPa) | Appearance |
| --- | --- | --- | --- | --- | --- | --- |
| | Si | Electroconductive particles | | | | |
| Example | | | | | | |
| 2 | 20 | TiC80 | 28 | $5 \times 10^{-3}$ | 161 | No cracks |
| 3 | 20 | $TiB_280$ | 29 | $2 \times 10^{-3}$ | 145 | " |
| 4 | 20 | ZrN80 | 27 | $1 \times 10^{-3}$ | 155 | " |
| 5 | 5 | ZrC95 | 30 | $2 \times 10^{-5}$ | 101 | " |
| 6 | 20 | $ZrB_280$ | 28 | $5 \times 10^{-3}$ | 138 | " |
| 7 | 20 | $Cr_2N80$ | 20 | $7 \times 10^{-3}$ | 167 | " |
| 8 | 20 | $Cr_3C_280$ | 21 | $5 \times 10^{-3}$ | 161 | " |
| 9 | 20 | CrB80 | 21 | $6 \times 10^{-3}$ | 147 | " |
| 10 | 20 | HfN80 | 23 | $8 \times 10^{-3}$ | 161 | " |
| 11 | 90 | HfC10 | 12 | $3 \times 10^{2}$ | 355 | " |
| 12 | 20 | TaN80 | 26 | $6 \times 10^{-3}$ | 151 | " |
| 13 | 20 | TaC80 | 23 | $4 \times 10^{-5}$ | 162 | " |
| Examples | | | | | | |
| 14 | 20 | $TaB_280$ | 27 | $4 \times 10^{-3}$ | 155 | " |
| 15 | 20 | $Mo_2N80$ | 22 | $8 \times 10^{-3}$ | 171 | " |
| 16 | 20 | $Mo_2C80$ | 22 | $7 \times 10^{-4}$ | 162 | " |
| 17 | 20 | MoB80 | 27 | $6 \times 10^{-3}$ | 143 | " |
| 18 | 20 | NbN80 | 23 | $6 \times 10^{-3}$ | 153 | " |
| 19 | 25 | NbC75 | 27 | $6 \times 10^{-3}$ | 195 | " |
| 20 | 25 | $NbB_275$ | 26 | $5 \times 10^{-3}$ | 191 | " |
| 21 | 5 | WC95 | 30 | $3 \times 10^{-5}$ | 108 | " |
| 22 | 22 | $W_2C78$ | 28 | $3 \times 10^{-3}$ | 178 | " |
| 23 | 25 | TiB75 | 24 | $4 \times 10^{-3}$ | 185 | " |
| 24 | 20 | VN80 | 22 | $6 \times 10^{-3}$ | 182 | " |
| 25 | 30 | $WSi_270$ | 22 | $8 \times 10^{-4}$ | 225 | " |
| 26 | 90 | $TiSi_210$ | 13 | $3 \times 10^{3}$ | 345 | " |
| 27 | 90 | $ZrSi_210$ | 13 | $8 \times 10^{3}$ | 365 | " |
| 28 | 90 | $NbSi_210$ | 13 | $6 \times 10^{3}$ | 350 | " |
| 29 | 90 | $TaSi_210$ | 13 | $6 \times 10^{3}$ | 351 | " |
| 30 | 90 | $CrSi_210$ | 12 | $1 \times 10^{4}$ | 365 | " |
| 31 | 90 | $MoSi_210$ | 14 | $5 \times 10^{3}$ | 362 | " |
| 32 | 80 | VC20 | 14 | $2 \times 10^{1}$ | 360 | " |
| 33 | 75 | $Feh_3C15$ | 13 | $8 \times 10^{1}$ | 358 | " |
| 34 | 90 | ThC10 | 13 | $3 \times 10^{2}$ | 358 | " |
| 35 | 90 | $CeC_210$ | 13 | $5 \times 10^{2}$ | 362 | " |

TABLE 2-continued

| No. | Raw material ratio (wt. %) Si | Electroconductive particles | Void content (%) | Resistivity ($\Omega$ cm) | Bending strength (MPa) | Appearance |
| --- | --- | --- | --- | --- | --- | --- |
| 36 | 95 | $Cr_7C_25$ | 13 | $4 \times 10^3$ | 360 | " |

COMPARATIVE EXAMPLES 1-2

For comparison, a molded product was produced in the same manner as in Example 1 except that $Si_3N_4$ powder of 0.8 μm in average particle size was used in place of metallic Si powder. This was sintered by a hot press under 150 kg/cm² at 1800° C. for 4 hours under vacuum to obtain a sintered body. Separately, a molded product was produced in the same manner as in Example 1 with the addition of 3 vol % of $Y_2O_3$ and 3 vol % of AlN as sintering aids. This was sintered at 1800° C. for 4 hours under low-pressure in nitrogen atmosphere. Characteristics of the resulting sintered bodies are shown in Table 3.

based thermoplastic resin and stearic acid. The mixture was kneaded at 160° C. for 12 hours by a pressure kneader. The kneaded product was pulverized to 10 meshes or less. This was used as a raw material for conductor ceramics A. Separately, to 100 parts by weight of a raw material comprising a mixture of metallic Si powder of 0.9 μm in average particle size and $Al_2O_3$ powder of 2 μm in average particle size at the ratio as shown in Table 4 was added 9 parts by weight of a binder comprising a polyethylene based thermoplastic resin and stearic acid. The mixture was kneaded by a pressure kneader at 160° C. for 12 hours. The kneaded product was pulverized to 10 meshes or less. This was used as a raw material for insulant ceramics B.

TABLE 3

| Comparative Examples | Ceramics | Composition of sintered body (vol %) $Si_3N_4$ | TiN | $Al_2O_3$ | State of sintered body | Void content (%) | Resistivity ($\Omega$ cm) | Bending strength (MPa) |
| --- | --- | --- | --- | --- | --- | --- | --- | --- |
| 1 Hot pressing | A | 40 | 60 | — | Cracks | 4 | $7 \times 10^{-4}$ | Unmeasurable |
|  | B | 50 | — | 50 | Good | 4 | $8 \times 10^{10}$ | 330 |
| 2 Pressureless sintering | A | 37.6 | 56.4 | — | Cracks and deformation | 2 | $8 \times 10^{-4}$ | Unmeasurable |
|  | B | 48 | — | 48 | Deformation | 2 | $8 \times 10^{10}$ | 380 |

Both the hot press sintered body and pressureless sintered body cracked, so good ceramic composites were not obtainable. It is proposed that cracks or deformations do not occur in the products of the present invention because sintering temperature is low and there are open voids. Thus, stress caused by the difference in coefficient of thermal expansion is relaxed.

EXAMPLES 37-43

To 100 parts by weight of raw materials comprising a mixture of metallic Si powder of 0.9 μm in average particle size and TiN powder of 1.2 μm in average particle size at the ratio as shown in Table 4 was added 9 parts by weight of a binder comprising a polyethylene Then, the raw materials for A and B were filled in succession in a mold to produce a layered ring as shown in FIG. 3(A) and FIG. 3(B). FIG. 3(B) is cross-sectional view of FIG. 3(A) at Z—Z. After removal of the binder, the molded product was heated to 1100° C. at 5° C./min in nitrogen atmosphere and then heated from 1100° C. to 1350° C. at a rate of 3° C./h over a long period of time to obtain a sintered body of whisker/particle of $Si_3N_4=2/9$. Characteristics of the thus obtained sintered body are shown in Table 4.

TABLE 4

| No. | Ceramics | Composition of sintered body (vol %) $Si_3N_4$ | TiN | $Al_2O_3$ | Void content (%) | Resistivity ($\Omega$ cm) | Bending strength (MPa) |
| --- | --- | --- | --- | --- | --- | --- | --- |
| Examples |  |  |  |  |  |  |  |
| 37 | A | 95 | 5 | — | 8 | $4 \times 10^5$ | 420 |
|  | B | 90 | — | 10 | 13 | $8 \times 10^{13}$ | 400 |
| 38 | A | 90 | 10 | — | 13 | $2 \times 10^3$ | 403 |
|  | B | 90 | — | 10 | 12 | $8 \times 10^{13}$ | 400 |
| 39 | A | 80 | 20 | — | 14 | $9.7 \times 10^0$ | 395 |
|  | B | 80 | — | 20 | 14 | $6 \times 10^{12}$ | 390 |
| 40 | A | 60 | 40 | — | 16 | $3.1 \times 10^{-3}$ | 380 |
|  | B | 60 | — | 40 | 16 | $8 \times 10^{13}$ | 380 |
| 41 | A | 40 | 60 | — | 20 | $9 \times 10^{-4}$ | 280 |
|  | B | 40 | — | 60 | 18 | $7 \times 10^{12}$ | 250 |
| 42 | A | 20 | 80 | — | 23 | $2.1 \times 10^{-4}$ | 180 |
|  | B | 30 | — | 80 | 21 | $8 \times 10^{13}$ | 206 |
| 43 | A | 5 | 95 | — | 30 | $8 \times 10^{-5}$ | 103 |
|  | B | 20 | — | 80 | 26 | $7 \times 10^{13}$ | 158 |

Thus, according to the present invention, integrally molded and sintered ceramics comprising layers different in resistivity can be obtained by changing the amount of the electrically conductive compound.

FIG. 4 is a graph which shows the relation between content of TiN and the volume change on sintering and the relation between content of $Al_2O_3$ and the volume change on sintering.

As a comparative example, molding and sintering were effected in the same manner as in Comparative Example 2 except that the composition of sintered body was similar to that of Examples 37–43. The volume change on sintering is also shown in FIG. 4.

According to FIG. 4, the products of the present invention are superior sintered bodies which are extremely smaller in dimensional change than the pressureless sintered products. The products of the present invention are also free from cracks.

FIG. 5 shows relation between the bending strength and the test temperature.

According to FIG. 5, the products of the present invention show no reduction in strength, even at high temperatures. On the other hand, since the comparative products contain sintering aids, there exists a glass phase, which is softened at high temperature. This results in a reduction in strength at high temperatures.

bending strength: 420 MPa and dimensional change on sintering: +3.8%.

EXAMPLE 45

Sintered bodies were produced in the same manner as in Example 44 except that the particle size of the raw material ferro-Si powder was changed. The relation between the particle size and bending strength was also examined.

Figure 6:
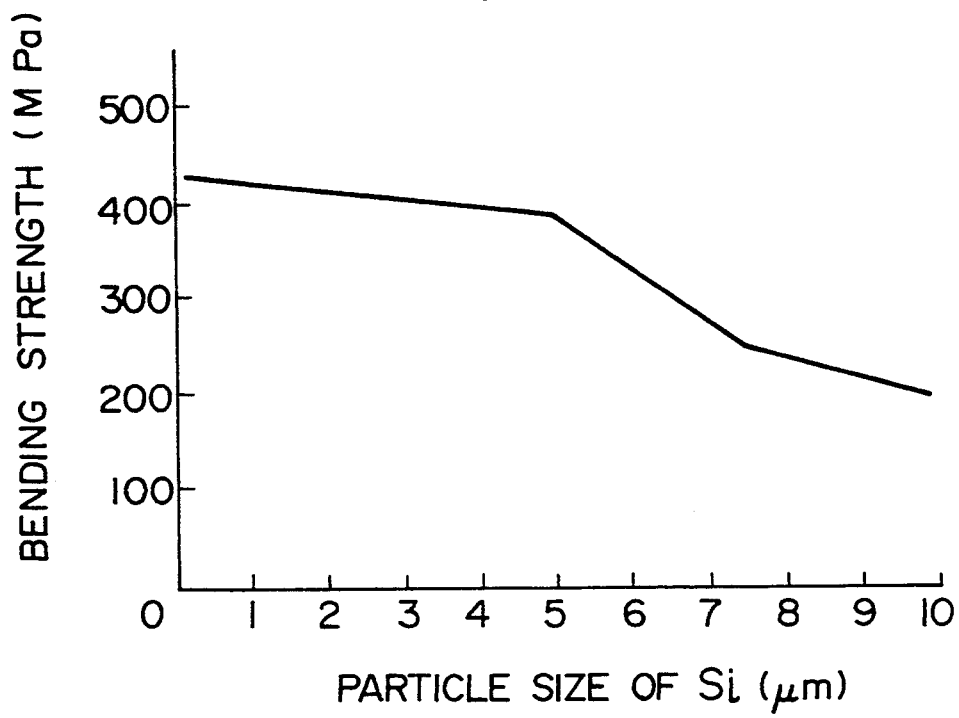
FIG. 6 is a graph which shows the relation between particle size of metallic Si and bending strength in the FIRST ASPECT of the present invention.

The results are shown in FIG. 6. A silicon particle size of 5 μm or less is preferred.

It is considered that when the particle size exceeds 5 μm, unnitrided Si remains in sintered body. This is evaporated by heating, resulting in reduction of strength.

EXAMPLES 46–50 AND COMPARATIVE EXAMPLES 3 AND 4

Molded products were prepared in the same manner as in Example 1. They were sintered with changing heating rate and changing stepwise heating time from 1100° C. to 1400° C., thereby obtaining sintered bodies adjusted in the amount of $Si_3N_4$ whisker produced. Characteristics of the resulting sintered body are shown in Table 5.

TABLE 5

| No. | Ceramics | Composition of sintered body (vol %) | | | | Void content (%) | Resistivity (Ω cm) | Bending strength (MPa) | Thermal shock resistance (times) |
| --- | --- | --- | --- | --- | --- | --- | --- | --- | --- |
| | | $Si_3N_4$ | $Si_3N_4$ Whisker | TiN | $Al_2O_3$ | | | | |
| Examples | | | | | | | | | |
| 46 | A | 39.6 | 0.4 | 60 | — | 21 | $9 \times 10^{-4}$ | 280 | 45 |
|    | B | 49.5 | 0.5 | — | 50 | 20 | $7 \times 10^{13}$ | 272 | 45 |
| 47 | A | 32 | 8 | 60 | — | 21 | $9 \times 10^{-4}$ | 281 | 47 |
|    | B | 40 | 10 | — | 50 | 19 | $7 \times 10^{13}$ | 273 | 47 |
| 48 | A | 24 | 16 | 60 | — | 21 | $9 \times 10^{-4}$ | 280 | 50 |
|    | B | 30 | 20 | — | 50 | 19 | $7 \times 10^{13}$ | 270 | 50 |
| 49 | A | 16 | 24 | 60 | — | 22 | $9 \times 10^{-4}$ | 270 | 52 |
|    | B | 20 | 30 | — | 50 | 20 | $7 \times 10^{13}$ | 270 | 52 |
| 50 | A | 12 | 28 | 60 | — | 22 | $9 \times 10^{-4}$ | 265 | 48 |
|    | B | 15 | 35 | — | 50 | 22 | $7 \times 10^{13}$ | 245 | 48 |
| Comparative Examples | | | | | | | | | |
| 3 | A | 39.76 | 0.24 | 60 | — | 22 | $9 \times 10^{-4}$ | 280 | 38 |
|   | B | 49.7 | 0.3 | — | 50 | 23 | $7 \times 10^{13}$ | 275 | 38 |
| 4 | A | 8 | 32 | 60 | — | 23 | $9 \times 10^{-4}$ | 221 | 33 |
|   | B | 10 | 40 | — | 50 | 23 | $7 \times 10^{13}$ | 220 | 33 |

EXAMPLE 44

To 100 parts by weight of a raw material comprising a mixture of 50 vol % (in terms of $Si_3N_4$) of ferro-Si powder (average particle size 2 μm) and 50 vol % of ZrN powder (average particle size 2 μm) was added 10 parts by weight of a polysilane compound as a binder. From this mixed powder, ceramic A was prepared in the same manner as in Example 1. Ceramic B was prepared in the same manner as in Example 1 except that 10 parts by weight of a polysilane compound was used as a binder. These powders were molded in the same manner as in Example 1. The molded product was heated to a maximum of 1450° C. with stepwise retention of time in nitrogen atmosphere to obtain a sintered body.

Characteristics of the resulting ceramics composite were relative density: 93%; resistivity: $4 \times 10^{-3}$ Ω cm;

From the above, it can be seen that the products of the present invention where $Si_3N_4$ whiskers were present in an amount of 1–70 vol % of $Si_3N_4$ phase produced from Si were superior in thermal shock resistance.

The thermal shock resistance was evaluated as follows: A sintered body was kept at 1200° C. for 30 minutes and then introduced into water to quench. This was repeated until cracks occurred. The number of the repetitions was taken as thermal shock resistance value.

EXAMPLES 51–57

Molded products were prepared in the same manner as in Example 1. Sintered bodies were obtained therefrom by changing oxygen partial pressure in nitriding gas. Characteristics of the sintered bodies are shown in Table 6.

TABLE 6

| No. | Ceramics | Composition of sintered body (vol %) | | | | | Resistivity ($\Omega$ cm) | Bending strength (MPa) | Thermal shock resistance (times) |
| --- | --- | --- | --- | --- | --- | --- | --- | --- | --- |
| | | $Si_3N_4$ | $Si_2N_2O$ | $SiO_2$ | TiN | $Al_2O_3$ | | | |
| Examples | | | | | | | | | |
| 51 | A | 40 | 0 | 0 | 60 | — | $9 \times 10^{-4}$ | 280 | 45 |
| | B | 50 | 0 | 0 | — | 50 | $7 \times 10^{13}$ | 270 | 45 |
| 52 | A | 36 | 4 | 0 | 60 | — | $9 \times 10^{-4}$ | 280 | 45 |
| | B | 45 | 5 | 0 | — | 50 | $7 \times 10^{13}$ | 270 | 45 |
| 53 | A | 24 | 16 | 0 | 60 | — | $9 \times 10^{-4}$ | 280 | 47 |
| | B | 30 | 20 | 0 | — | 50 | $7 \times 10^{13}$ | 272 | 47 |
| 54 | A | 20 | 16 | 4 | 60 | — | $3 \times 10^{-3}$ | 260 | 40 |
| | B | 25 | 20 | 5 | — | 50 | $5 \times 10^{14}$ | 260 | 40 |
| 55 | A | 0 | 32 | 8 | 60 | — | $8 \times 10^{-3}$ | 251 | 28 |
| | B | 0 | 40 | 10 | — | 50 | $8 \times 10^{14}$ | 253 | 28 |
| 56 | A | 0 | 4 | 36 | 60 | — | $2 \times 10^{-2}$ | 205 | 20 |
| | B | 0 | 5 | 45 | — | 50 | $8 \times 10^{14}$ | 210 | 20 |
| 57 | A | 0 | 0 | 40 | 60 | — | $4 \times 10^{-2}$ | 191 | 15 |
| | B | 0 | 0 | 50 | — | 50 | $9 \times 10^{14}$ | 198 | 15 |

From the above, it is seen that when amounts of $Si_2N_2O$ and $SiO_2$ are larger than that of $Si_3N_4$ in the phase produced from Si, resistivity and thermal shock resistance tend to decrease.

EXAMPLES 58–61

Sintered bodies were prepared in time same manner as in Example 1 except that the raw materials as shown in Table 7 were used in place of TiN and $Al_2O_3$ particles. The results are shown in Table 7.

According to time present invention, integral molding and sintering with optional combination of resistivities within the range of $10^{14}$ $\Omega$ cm to $10^{-5}$ $\Omega$ cm are possible by compositely combining a conductive compound and an insulating compound.

TABLE 7

| No. | Ceramics | Raw material ratio (wt. %) | Resistivity ($\Omega$ cm) | Bending strength (MPa) |
| --- | --- | --- | --- | --- |
| Examples | | | | |
| 58 | A | Si(25), TiC(10), ZrN(65) | $5 \times 10^{-3}$ | 182 |
| | B | Bi(30), TiN(30), SiC(40) | $2 \times 10^{-1}$ | 205 |
| 59 | A | Si(50), $ZrO_2$(10), $Cr_2N$(40) | $2 \times 10^{-2}$ | 275 |
| | B | Si(30), $Al_2O_3$(50), $Si_3N_4$(20) | $4 \times 10^{13}$ | 232 |
| 60 | A | Si(30), $B_4C$(10), TiC(60) | $8 \times 10^{-3}$ | 205 |
| | B | Si(30), $Si_2N_2O$(10), $ZrO_2$(60) | $3 \times 10^{13}$ | 213 |
| 61 | A | Si(30), $TiSi_2$(5), WC(65) | $4 \times 10^{-4}$ | 189 |
| | B | Si(30), CrB(5), $Al_2O_3$(65) | $2 \times 10^2$ | 193 |

EXAMPLE 62

$Si_3N_4$/TiN conductive ceramics and $Si_3N_4$/$Al_2O_3$ insulating ceramics obtained in Example 1 were integrally molded and sintered as shown in FIG. 3(A) and FIG. 3(B) as a current collector for an automobile alternator. Current collecting characteristics thereof were examined. The results are shown in Table 8. From the results, it can be seen that the product of the present invention is superior to the conventional copper/heat resisting resin in heat resistance and wear resistance.

TABLE 8

| | Example 62 | Comparative Example 5 |
| --- | --- | --- |
| Current Collecting ring | | |
| Conductive portion | $Si_3N_4$/TiN | Copper |
| Insulating portion | $Si_3N_4$/$Al_2O_3$ | Heat resisting resin |
| Current collector | Carbon | Carbon |
| State of sliding surface | | |
| Current collecting ring | Gloss | Blackish brown |
| Current collector | Gloss | Scratch |
| Damage | | |
| Current Collecting ring | 1–3 $\mu$m | 10–20 $\mu$m |
| Current collector | 0 | 0.82 |
| Spark | No | No |
| State after test | No change | Scorching mark in the insulating portion Blackening of copper portion |

Condition: 30,000 rpm
Current density of current collector 70 A/cm$^2$

EXAMPLE 63

Figure 7A:
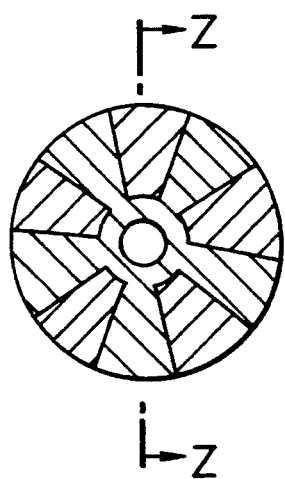
FIGS. 7(A) and 7(B) are schematical cross-sectional views of a further embodiment according to the FIRST ASPECT of the present invention.
Figure 7B:
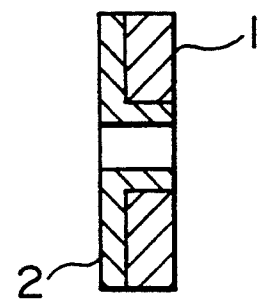

$Si_3N_4$/TiN conductive ceramics and $Si_3N_4$/$Al_2O_3$ ceramics obtained in Examples 1 were integrally molded and sintered as shown in FIG. 7(A) and FIG. 7(B) as a commutator for an automobile starter motor. Current collecting characteristics were examined. As in Example 63, it has been confirmed that the product of the present invention is superior to the conventional copper/heat resisting resin in heat resistance and wear resistance. Also, the production of a non-combustible motor is possible.

EXAMPLE 64

To 100 parts by weight of raw material comprising a mixture of 22.7 wt. % of metallic Si powder of 0.5 $\mu$m in average particles size and 77.3 wt. % of TiN whisker of 50 in aspect ratio and 50 $\mu$m in length was added 9 parts by weight of binder comprising a low-density polyethylene, a synthetic wax and stearic acid. The mixture was kneaded by a pressure kneader at 160° C.

for 12 hours. The kneaded product was pulverized to 10 meshes or less. This was used as a ceramic conductor A.

Separately, to 100 parts by weight of raw material comprising a mixture of 38 wt. % of metallic Si powder of 0.9 μm in average particle size and 62 wt. % of $Al_2O_3$ of 35 μm in average particle size was added 9 parts by weight of the above binder. The mixture was kneaded and pulverized in the same manner as above. This was used as a raw material for insulant ceramic B. In the same manner as in Example 1, a composite sintered body was prepared using these ceramics A and B.

Dimensional change of this sintered body was +0.2. The portion A had a resistivity of $7 \times 10^{-4}$ Ω cm, a void of 18%, a bending strength of 291 MPa and a coefficient of thermal expansion of $5.2 \times 10^{-6}$. The portion B had a resistivity of $5 \times 10^{13}$ Ω cm, a void of 20%, a bending strength of 250 MPa and a coefficient of thermal expansion of $5.1 \times 10^{-6}$.

EXAMPLES 65-70

To 500 g of a mixed powder comprising SiC particle of 16 μm in average particle size and metallic Si of 0.9 μm in average particle size at the ratio as shown in Table 8 was added 8-12 parts by weight of a molding binder comprising 21% of polyethylene (melt index 1.5), 43% of polyethylene wax (PE-520 manufactured by Hoecht, Japan) 21% of blend wax (D-556 manufactured by Chukyo Yushi Co.) and 15% of stearic acid. The mixture was kneaded in a pressure kneader at 160° C. for 5 hours. The kneaded product was crushed to obtain a raw material under test. This raw material was molded into a molded body of 50 mm in diameter and 20 mm thick by a mechanical press at 160° C. under a molding pressure of 1000 kgf/cm². Volumetric packing of particle of the resulting molded body was at least 70 vol %. This molded body from which the molding binder had been removed was heated from 1100° C. to 1350° C. at a rate of 4° C./h in a nitrogen atmosphere. A sintered body with whisker/particle of $Si_3N_4$ of 1/9 was obtained. The blending ratio of whisker/particle can be adjusted by changing heating rate and retention time. The ratio of whisker/particle can be obtained by observation of the sintered body under scanning electron microscope and transmission electron microscope.

Characteristics of the obtained sintered body are shown in Table 8. The breaking toughness was measured by a notched beam method using a test piece of 3×4×40 mm having a notch of 0.5 mm made by a diamond wheel. For the thermal shock, the sintered body was kept at 1250° C. for 30 minutes and then introduced into water to quench it. This was repeated until cracks occurred. The thermal shock was evaluated by the number of the repetition.

Next, mixed powder of the compositions as shown in Comparative Examples 65-70 of Table 9 was prepared. This mixed powder contained $Y_2O_3$ as a sintering aid. This was molded in the same manner as above and sintered at 1700° C. for 5 hours to obtain a sintered body. Characteristics of the obtained sintered body are shown in Table 9.

FIG. 8 shows the relation between the content of SiC and the rate of dimensional change on sintering. The product (A) of the present invention is a markedly superior sintered body with very small rate of dimensional change as compared with the product (B) comprising $Si_3N_4$ powder, SiC powder to which sintering aid $Y_2O_3$ was added.

TABLE 8

| Example | Raw-material (vol %) Si | Raw-material (vol %) SiC | Volumetric packing of particles in molded product (%) | Composition of sintered body (vol %) $Si_3N_4$ | Composition of sintered body (vol %) SiC | Dimensional change on sintering (%) | Bending strength (MN/m²) Room temperature | Bending strength (MN/m²) 1200° C. | Breaking toughness (MN/m^{3/2}) | Thermal shock resistance (Times) |
|---|---|---|---|---|---|---|---|---|---|---|
| 65 | 100 | 0 | 72 | 100 | 0 | 0.13 | 584 | 582 | 5 | 43 |
| 66 | 90 | 10 | 75 | 90 | 10 | 0.12 | 512 | 510 | 6 | 45 |
| 67 | 80 | 20 | 74 | 80 | 20 | 0.12 | 490 | 489 | 7 | 50 |
| 68 | 70 | 30 | 73 | 70 | 30 | 0.12 | 430 | 430 | 7 | 50 |
| 69 | 60 | 40 | 75 | 60 | 40 | 0.12 | 390 | 390 | 7 | 50 |
| 70 | 45 | 55 | 74 | 45 | 55 | 0.12 | 310 | 310 | 6 | 49 |

TABLE 9

| Comparative Examples | Composition of sintered body (vol %) $Si_3N_4$ | Composition of sintered body (vol %) $Y_2O_3$ | Composition of sintered body (vol %) SiC | Bending strength (MN/m²) Room temperature | Bending strength (MN/m²) 1200° C. | Breaking toughness (MN/m^{3/2}) | Thermal shock resistance (times) |
|---|---|---|---|---|---|---|---|
| 5 | 93 | 7 | 0 | 753 | 352 | 5 | 21 |
| 6 | 84 | 6 | 10 | 518 | 321 | 3 | 21 |
| 7 | 75 | 5 | 20 | 462 | 255 | 3 | 18 |
| 8 | 66 | 4 | 30 | 391 | 211 | 3 | 17 |
| 9 | 57 | 3 | 40 | 358 | 208 | 3 | 15 |
| 10 | 42 | 3 | 55 | 211 | 127 | 2 | 15 |

EXAMPLES 71-113

Sintered bodies were prepared in the same manner as in Example 69 except that the inorganic compounds shown in Table 10 were used in place of SiC powder. Characteristics of the resulting sintered bodies are shown in Table 10.

It can be seen from Table 10 that the products of the present invention are superior in high-temperature strength, breaking toughness and thermal shock resistance. The rate of dimensional change on sintering was nearly the same as shown by curve (A) in FIG. 8.

TABLE 10 (1)

| Examples | Raw material compound in sintered body (40 vol %) | Bending strength (MN/m²) Room temperature | Bending strength (MN/m²) 1200° C. | Void content (%) | Breaking toughness (MN/m^{3/2}) | Thermal shock resistance (times) |
|---|---|---|---|---|---|---|
| 71 | TiN | 358 | 351 | 12 | 7 | 48 |
| 72 | $Si_3N_4$ | 362 | 354 | 12 | 5 | 45 |
| 73 | $Si_2N_2O$ | 341 | 330 | 13 | 6 | 48 |
| 74 | TiC | 367 | 358 | 12 | 7 | 48 |
| 75 | $TiO_2$ | 357 | 352 | 12 | 7 | 47 |
| 76 | AlN | 365 | 360 | 11 | 7 | 50 |
| 77 | $Al_2O_3$ | 351 | 343 | 12 | 7 | 48 |
| 78 | $SiO_2$ | 342 | 336 | 13 | 6 | 45 |
| 79 | ZrN | 361 | 356 | 11 | 7 | 51 |
| 80 | $ZrO_2$ | 356 | 345 | 12 | 7 | 49 |
| 81 | ZrC | 356 | 354 | 12 | 7 | 52 |
| 82 | $TiB_2$ | 332 | 330 | 13 | 6 | 48 |
| 83 | $ZrB_2$ | 341 | 335 | 13 | 6 | 48 |
| 84 | $Cr_3C_2$ | 356 | 352 | 12 | 7 | 51 |
| 85 | CrB | 332 | 329 | 13 | 6 | 47 |
| 86 | $Cr_2N$ | 365 | 359 | 11 | 7 | 53 |
| 87 | $Cr_7C_2$ | 355 | 353 | 12 | 7 | 51 |
| 88 | WC | 345 | 341 | 12 | 7 | 47 |
| 89 | $W_2C$ | 346 | 343 | 12 | 7 | 47 |
| 90 | $WSi_2$ | 331 | 330 | 13 | 6 | 45 |
| 91 | $TiSi_2$ | 333 | 328 | 13 | 6 | 45 |
| 92 | $ZrSi_2$ | 338 | 335 | 13 | 6 | 45 |
| 93 | $Fe_3C$ | 362 | 359 | 11 | 8 | 52 |
| 94 | VC | 356 | 346 | 12 | 7 | 49 |
| 95 | VN | 367 | 364 | 11 | 7 | 51 |
| 96 | $CeC_2$ | 367 | 366 | 11 | 7 | 50 |
| 97 | MgO | 336 | 328 | 13 | 6 | 45 |
| 98 | $Mo_2N$ | 349 | 346 | 12 | 7 | 49 |
| 99 | $Mo_2C$ | 365 | 346 | 12 | 7 | 50 |

TABLE 10 (2)

| Examples | Raw material compound in sintered body (40 vol %) | Bending strength (MN/m²) Room temperature | Bending strength (MN/m²) 1200° C. | Void content (%) | Breaking toughness (MN/m^{3/2}) | Thermal shock resistance (times) |
|---|---|---|---|---|---|---|
| 100 | MoB | 336 | 324 | 13 | 6 | 45 |
| 101 | ThC | 368 | 358 | 12 | 7 | 50 |
| 102 | HfN | 359 | 355 | 12 | 7 | 52 |
| 104 | HfC | 357 | 354 | 12 | 7 | 52 |
| 105 | TaN | 349 | 347 | 12 | 7 | 49 |
| 106 | TaC | 347 | 346 | 12 | 7 | 51 |
| 107 | $TaB_2$ | 341 | 332 | 13 | 7 | 46 |
| 108 | HbN | 338 | 331 | 13 | 7 | 47 |
| 109 | BeO | 359 | 358 | 12 | 7 | 50 |
| 110 | WN | 356 | 352 | 12 | 7 | 52 |
| 111 | CaO | 352 | 347 | 12 | 7 | 50 |
| 112 | $TaSi_2$ | 335 | 331 | 13 | 7 | 48 |
| 113 | $CrSi_2$ | 332 | 328 | 13 | 7 | 47 |

EXAMPLES 114–117

Sintered bodies were prepared in the same manner as in Example 69 except that the SiC whiskers as shown in Table 11 were used in place of SiC powder. Characteristics of the resulting sintered bodies are shown in Table 11. The rate of dimensional change on sintering was less than 0.13% for all of them. From the results, it can be seen that the preferable average aspect ratio of a raw material whisker is 200 or less and the preferable average length is 200 μm or less.

TABLE 11

| Examples | Raw material whisker in sintered body Average aspect ratio | Raw material whisker in sintered body Average length (μm) | Bending strength room temp. | Bending strength 1200° C. | Breaking toughness (MN/m^{3/2}) | Thermal resistance (times) |
|---|---|---|---|---|---|---|
| 114 | 180 | 50 | 364 | 356 | 8 | 55 |
| 115 | 50 | 150 | 374 | 375 | 8 | 55 |
| 116 | 230 | 100 | 310 | 305 | 6 | 50 |
| 117 | 50 | 220 | 312 | 310 | 6 | 50 |

EXAMPLE 118–124

Molded products were prepared in the same manner as in Examples 65–70. They were then sintered by changing the heating time stepwise to 1400° C. in a nitrogen atmosphere thereby to adjust the amount of $Si_3N_4$ whisker produced. Test results of the resulting sintered bodies are shown in Table 12. From the results, it can be seen that the products of the present invention, where 1–70 vol % of $Si_3N_4$ whisker was present for 100 vol % of the produced $Si_3N_4$ phase, were especially tough.

TABLE 12

| Examples | Composition of sintered body (vol %) | | | Bending strength (MN/m$^2$) | | Breaking troughness (MN/m$^{3/2}$) | Thermal shock resistance (times) |
|---|---|---|---|---|---|---|---|
| | Si$_3$N$_4$ | Si$_3$N$_4$ whisker | SiC | Room temp. | 1200° C. | | |
| 118 | 49.5 | 0.5 | 50 | 330 | 334 | 6 | 50 |
| 119 | 40 | 10 | 50 | 332 | 332 | 7 | 50 |
| 120 | 30 | 20 | 50 | 334 | 331 | 7 | 50 |
| 121 | 20 | 30 | 50 | 332 | 331 | 7 | 50 |
| 122 | 15 | 35 | 50 | 335 | 332 | 6 | 50 |
| 123 | 49.7 | 0.3 | 50 | 331 | 332 | 4 | 50 |
| 124 | 10 | 40 | 50 | 334 | 332 | 4 | 50 |

EXAMPLES 125–129

Figure 12:
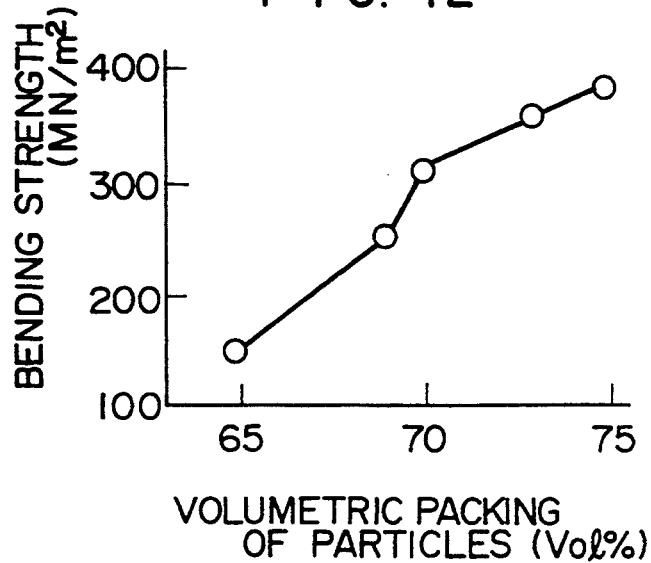

Table 13 shows the characteristics of sintered bodies made in accordance with Example 65 using 55 of Si, 45 of SiC and molding binder in the amounts changed within the range of 5–13 parts by weight whereby the volumetric particle packing rate of molding products was changed. Relation between the volumetric particle packing rate of molded products and bending strength is shown in FIG. 12. From these results, it can be seen that molded products having a volumetric particle packing rate of at least 70 vol % are preferred.

TABLE 13

| Examples | Volumetric packing of particles in molded product (%) | Bending strength (MN/m$^2$) | | Breaking toughness (MN/m$^{3/2}$) | shock resistance (times) |
|---|---|---|---|---|---|
| | | Room temp. | 1200° C. | | |
| 125 | 65 | 154 | 154 | 3 | 42 |
| 126 | 69 | 257 | 254 | 3 | 48 |
| 127 | 70 | 310 | 310 | 5 | 48 |
| 128 | 73 | 359 | 358 | 6 | 50 |
| 129 | 75 | 390 | 390 | 7 | 50 |

EXAMPLES 130–144

Table 14 shows the volumetric particle packing rate of molded bodies made in the same manner as in Example 65 except that the blending ratio of raw materials and the amount of molding binder are changed.

Figure 13:
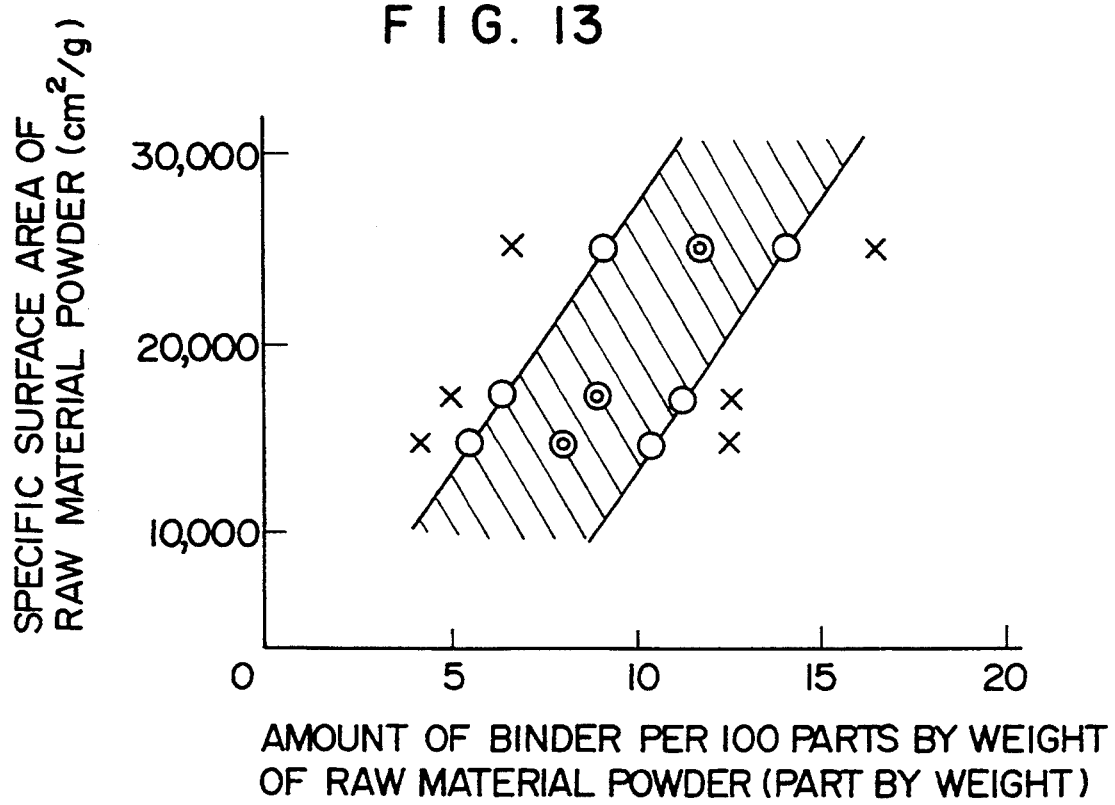
FIG. 13 is a graph which shows the relation between specific surface area of raw material powder and amount of molding binder in the SECOND ASPECT of the present invention.

FIG. 13 shows relation between the specific surface area of the raw materials and the suitable amount of binder. When the relation is within the hatched area, the volumetric particle packing rate of molded bodies can be at least 70 vol %.

TABLE 14

| Examples | Raw material (parts by weight) | | surface area of raw material (cm$^2$/g) | Amount of molding binder (part by weight) | Volumetric packing of particles in molded product (vol %) |
|---|---|---|---|---|---|
| | Si | SiC | | | |
| 130 | 60 | 40 | 17100 | 5.0 | 65 |
| 131 | 60 | 40 | 17100 | 6.5 | 70 |
| 132 | 60 | 40 | 17100 | 9.0 | 76 |
| 133 | 60 | 40 | 17100 | 11.5 | 70 |
| 134 | 60 | 40 | 17100 | 12.5 | 64 |
| 135 | 90 | 10 | 25100 | 6.5 | 64 |
| 136 | 90 | 10 | 25100 | 9.3 | 70 |
| 137 | 90 | 10 | 25100 | 11.8 | 75 |
| 138 | 90 | 10 | 25100 | 14.3 | 70 |
| 139 | 90 | 10 | 25100 | 16.3 | 63 |
| 140 | 50 | 50 | 14500 | 4.1 | 63 |
| 141 | 50 | 50 | 14500 | 5.6 | 70 |
| 142 | 50 | 50 | 14500 | 8.1 | 76 |
| 143 | 50 | 50 | 14500 | 10.5 | 70 |
| 144 | 50 | 50 | 14500 | 12.4 | 62 |

EXAMPLES 145

The apparent viscosity of the kneaded products of the raw materials and the molding binder in Examples 130–144 was measured by a flow tester.

Figure 14:
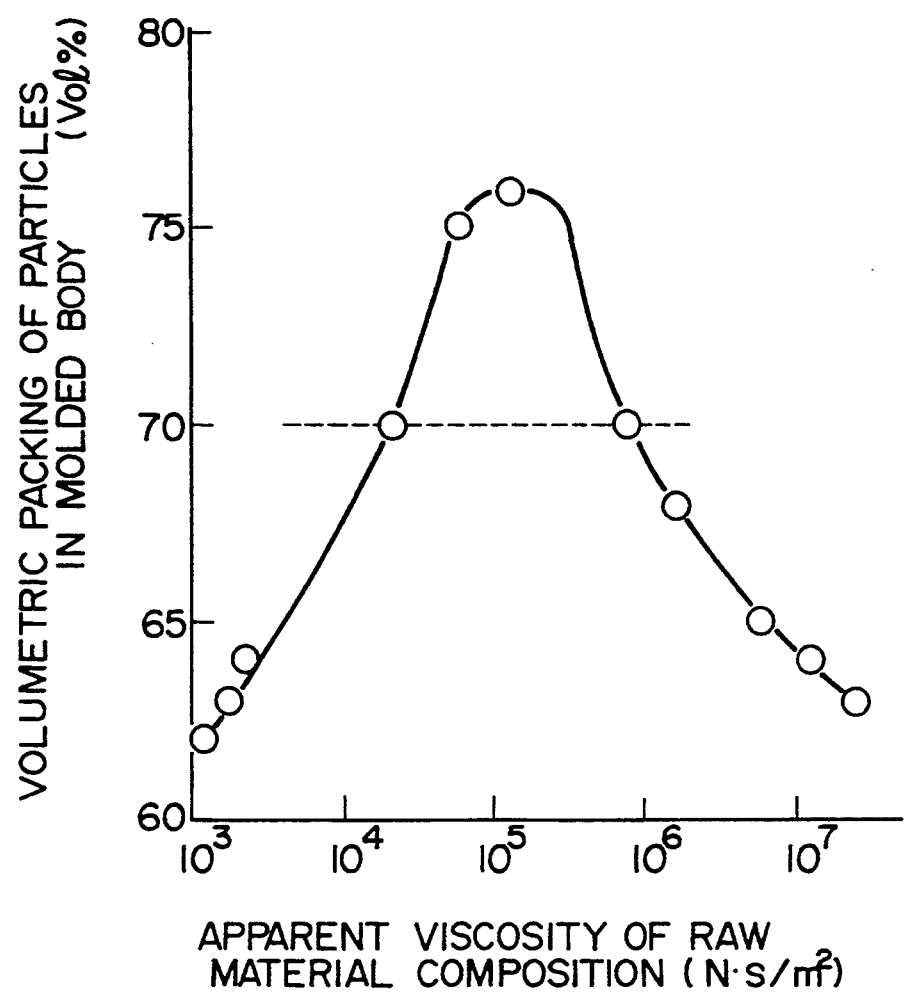
FIG. 14 is a graph which shows the relation between apparent viscosity of raw material composition measured by flow tester and volumetric particle packing rate in the SECOND ASPECT of the present invention.
Figure 17:
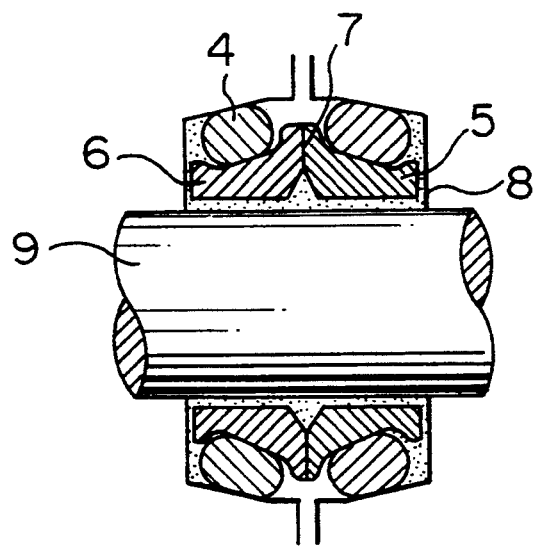
FIG. 17 is a cross-sectional view of an example of a conventional floating seal.

The relation between the apparent viscosity and the volumetric particle packing rate of the molded bodies is shown in FIG. 14. The smaller value of the apparent viscosity indicates better flowability, namely, superior moldability.

The apparent viscosity was measured by a flow tester having a nozzle of 6 mm diameter and 6.8 mm length at 150° C. and under a pressure of 39 MN/m$^2$.

FIG. 14 shows that the molded products can have a volumetric particle packing rate of at least 70 vol % by using a composition having an apparent viscosity within the range of $(3–90) \times 10^4$ N·s/m$^2$. The apparent viscosity of this range is relatively low. Thus molded products of complicated shape can be easily produced.

EXAMPLE 146

60 Parts by weight of metallic Si powder of 0.9 μm in average particle size and 40 parts by weight of α-SiC powder of 16 μm in average particle size were mixed together with methanol in a pot mill and dried. Then, thereto was added 9 parts by weight of a polyethylene wax and the mixture was kneaded by a pressure kneader at 150° C. for 5 hours. Then, time mixture was pulverized and molded at 150° C. and under 1000 kg/cm$^2$ to a ring of 60 mm in outer diameter and 40 mm in inner diameter. After removal of the wax, the molded body was subjected to stepwise heat treatment to 1380° C. over a long period of time in nitrogen atmosphere to obtain a sintered body. Dimensional change between the molded body and the sintered body was small, namely, 0.15%. The sintered body was superior in dimensional accuracy. Void content of the sintered body was 15% and diameter of void was 20 pm or less.

Sliding surface was produced by polishing. The sliding surface was subjected to a sliding test using Al$_2$O$_3$ (relative density: 98%) as a partner material. The results are shown in Table 15. As a comparative example, results of test between FC-20 cast-iron products are also shown in Table 15.

FIG. 15 shows a micrograph of the sliding surface of the sintered body obtained in this Example. In FIG. 15, 1 indicates a matrix phase, 2 indicates Si$_3$N$_4$ particles and 3 indicates voids.

From Table 1, it can be seen that the product of the present invention is small in friction coefficient and superior in wear resistance.

The relation between the surface pressure and the friction coefficient when the surface pressure was changed while keeping the sliding speed at a constant 3 m/sec is shown by curve A in FIG. 16. The result on Comparative Example 11 is also shown by curve B in FIG. 16. It can be recognized that the product of the present invention is superior in sliding characteristics.

TABLE 15

| | Sliding material | | Friction coeffi- | Total abrasion wear (mg/cm/ | State of |
|---|---|---|---|---|---|
| | (I) | (II) | cient | 100 h) | sliding |
| Example 146 | SiC/ Si$_3$N$_4$ | Al$_2$O$_3$ | 0.008 | 0.06 | Good |
| Comparative Example 11 | FC-20 | FC-20 | 0.12 | 72 | Bragging |

Sliding conditions: In machine oil at surface pressure of 10 kgf/cm$^2$ and sliding speed of 3m/sec.

EXAMPLES 147–204

The sliding test was conducted in the same manner as in Example 146 except that Al$_2$O$_3$ was replaced by other materials as the partner material. The results are shown in Table 16. Results of comparative examples are shown in Table 17. Sliding conditions were surface pressure: 2 kgf/cm$^2$ and sliding speed: 2 m/sec.

From the results, it can be seen that the products of the present invention are small in friction coefficient and superior in thermal shock resistance. This is because the products of the present invention have open voids and comprise composite material. When the test was conducted using SiC, Si$_3$N$_4$ having the same particle hardness as the partner material, particles of the products of the present invention were falling off, leaving great sliding marks. The thermal shock resistance was evaluated as follows: A sintered body was kept at 1200° C. for 30 minutes and then quenched in water. This was repeated until cracks occurred. The number of the repetitions was taken for evaluation.

TABLE 16

| No. | Partner material for sliding test | Friction coeffi- cient | SiC/ Si$_3$N$_4$ Abrasion wear (mg/cm$^2$ /100 h) | Abrasion wear of partner material (mg/cm$^2$ /100 h) | Thermal shock re- sistance of SiC/ Si$_3$N$_4$ (times) |
|---|---|---|---|---|---|
| Examples | | | | | |
| 147 | AlN | 0.014 | 0.03 | 0.08 | 51 |
| 148 | SiO$_2$ glass | 0.008 | 0.02 | 0.04 | 51 |
| 149 | SiO$_2$ | 0.007 | 0.03 | 0.03 | 51 |
| 150 | TiN | 0.013 | 0.04 | 0.08 | 51 |
| 151 | TiO$_2$ | 0.008 | 0.03 | 0.04 | 51 |
| 152 | ZrN | 0.012 | 0.03 | 0.09 | 51 |
| 153 | ZrO$_2$ | 0.007 | 0.03 | 0.04 | 51 |
| 154 | carbon | 0.010 | 0.01 | 0.20 | 51 |
| 155 | MgO | 0.010 | 0.02 | 0.03 | 51 |
| 156 | apatite | 0.012 | 0.02 | 0.04 | 51 |
| 157 | ZnO | 0.009 | 0.01 | 0.04 | 51 |
| 158 | ferite | 0.008 | 0.03 | 0.05 | 51 |
| 159 | UO$_2$ | 0.010 | 0.03 | 0.05 | 51 |
| 160 | BaTiO$_2$ | 0.009 | 0.02 | 0.07 | 51 |
| 161 | PZT | 0.009 | 0.01 | 0.04 | 51 |
| 162 | B$_4$C | 0.007 | 0.03 | 0.08 | 51 |
| 163 | ZrB$_2$ | 0.012 | 0.03 | 0.12 | 51 |
| 164 | TiB$_2$ | 0.012 | 0.03 | 0.11 | 51 |
| 165 | TiO | 0.009 | 0.03 | 0.04 | 51 |
| 166 | BeO | 0.009 | 0.03 | 0.05 | 51 |
| 167 | (ZrO)P$_2$O$_7$ | 0.010 | 0.04 | 0.06 | 51 |
| 168 | beryl | 0.010 | 0.03 | 0.05 | 51 |
| 169 | TiO$_2$—Al$_2$O$_3$ | 0.008 | 0.04 | 0.03 | 51 |
| 170 | cordierite | 0.009 | 0.03 | 0.02 | 51 |
| 171 | β-spodumene | 0.011 | 0.03 | 0.04 | 51 |
| 172 | ZrC | 0.010 | 0.03 | 0.11 | 51 |
| 173 | MgAl$_2$O$_4$ | 0.012 | 0.02 | 0.04 | 51 |
| 174 | BeAl$_2$O$_4$ | 0.010 | 0.04 | 0.06 | 51 |
| 175 | Be$_2$SiO$_4$ | 0.011 | 0.03 | 0.05 | 51 |
| 176 | ZrSiO$_4$ | 0.011 | 0.04 | 0.05 | 51 |
| 177 | celsian | 0.012 | 0.04 | 0.04 | 51 |
| 178 | willemite | 0.012 | 0.04 | 0.05 | 51 |
| 179 | 3Al$_2$O$_3$.2SiO$_2$ | 0.009 | 0.04 | 0.04 | 51 |
| 180 | 2BaO.3SiO$_2$ | 0.009 | 0.02 | 0.04 | 51 |
| 181 | MgO—SiO$_2$ | 0.009 | 0.03 | 0.04 | 51 |
| 182 | MgO | 0.009 | 0.04 | 0.03 | 51 |
| 183 | B$_2$O$_3$ | 0.009 | 0.03 | 0.04 | 51 |
| 184 | MoC | 0.010 | 0.05 | 0.11 | 51 |
| 185 | Al$_2$O$_3$—ZrO$_2$ | 0.008 | 0.03 | 0.04 | 51 |
| 186 | Al$_2$O$_3$—TiN | 0.008 | 0.04 | 0.08 | 51 |
| 187 | SiO$_2$—Al$_2$O$_3$ | 0.008 | 0.03 | 0.07 | 51 |
| 188 | TiC | 0.009 | 0.07 | 0.15 | 51 |
| 189 | Al$_2$O$_3$—TiC | 0.008 | 0.05 | 0.09 | 51 |
| 190 | CaO | 0.010 | 0.02 | 0.05 | 51 |
| 191 | TaC | 0.011 | 0.04 | 0.13 | 51 |
| 192 | SUS304 | 0.009 | 0.01 | 0.03 | 51 |
| 193 | Cr cast iron | 0.009 | 0.01 | 0.02 | 51 |
| 194 | Super hard alloy | 0.009 | 0.01 | 0.02 | 51 |
| 195 | FC20 | 0.009 | 0.01 | 0.03 | 51 |
| 196 | Ni-Resist | 0.009 | 0.01 | 0.02 | 51 |
| 197 | Steatite | 0.009 | 0.01 | 0.02 | 51 |
| 198 | Ni-cast iron | 0.009 | 0.01 | 0.02 | 51 |
| 199 | Al bronze | 0.010 | 0.01 | 0.04 | 51 |
| 200 | P bronze | 0.010 | 0.01 | 0.04 | 51 |
| 201 | MoS$_2$—C | 0.007 | 0.01 | 0.02 | 51 |
| 202 | Teflon | 0.007 | 0.01 | 0.02 | 51 |
| 203 | Fluorine containing resin | 0.007 | 0.01 | 0.02 | 51 |
| 204 | Glass-nylon | 0.008 | 0.01 | 0.02 | 51 |

Sliding conditions: in machine oil at surface pressure of 2 kg/cm$^2$ and sliding speed of 2 m/sec.

TABLE 17

| | Condition of sliding materials | | Friction coeffi- | (I) Abrasion wear (mg/cm$^2$/ | (II) Abrasion wear (mg/cm$^2$/ | Thermal shock resistance (times) | |
|---|---|---|---|---|---|---|---|
| No. | (I) | (II) | cient | 100 h | 100 h | (I) | (II) |
| Comparative Examples | | | | | | | |
| 12 | SiC | SiC | 0.12 | 0.24 | 0.24 | 31 | 31 |
| 13 | SiC | Si$_3$N$_4$ | 0.15 | 0.22 | 0.31 | 31 | 37 |
| 14 | SiC | Al$_2$O$_3$ | 0.18 | 0.18 | 0.41 | 31 | 12 |
| 15 | SiC | TiC | 0.12 | 0.19 | 0.22 | 31 | 30 |
| 16 | SiC | SiO$_2$ | 0.17 | 0.12 | 0.75 | 31 | 19 |
| 17 | SiC | TiO$_2$ | 0.15 | 0.19 | 0.42 | 31 | 24 |

TABLE 17-continued

| | Condition of sliding materials | | Friction coeffi- cient | (I) Abrasion wear (mg/cm$^2$/ 100 h) | (II) Abrasion wear (mg/cm$^2$/ 100 h) | Thermal shock resistance (times) | |
|---|---|---|---|---|---|---|---|
| No. | (I) | (II) | | | | (I) | (II) |
| 18 | SiC | Carbon | 0.12 | 0.09 | 0.96 | 31 | — |
| 19 | SiC | ZrO$_2$ | 0.14 | 0.18 | 0.22 | 31 | 16 |
| 20 | SiC | ZrN | 0.16 | 0.17 | 0.23 | 31 | 30 |
| 21 | SiC | AlN | 0.11 | 0.14 | 0.31 | 31 | 28 |
| 22 | SiC | MgO | 0.22 | 0.16 | 0.56 | 31 | 10 |
| 23 | SiC | B$_4$C | 0.14 | 0.21 | 0.26 | 31 | 20 |
| 24 | SiC | UO$_2$ | 0.15 | 0.19 | 0.18 | 31 | 19 |
| 25 | Si$_3$N$_4$ | Si$_3$N$_4$ | 0.14 | 0.24 | 0.24 | 37 | 37 |
| 26 | Si$_3$N$_4$ | Al$_2$O$_3$ | 0.23 | 0.18 | 0.42 | 37 | 12 |
| 27 | Si$_3$N$_4$ | TiC | 0.18 | 0.34 | 0.22 | 37 | 30 |
| 28 | Si$_3$N$_4$ | SiO$_2$ | 0.19 | 0.19 | 0.56 | 37 | 19 |
| 29 | Si$_3$N$_4$ | TiO$_2$ | 0.18 | 0.20 | 0.22 | 37 | 24 |
| 30 | Si$_3$N$_4$ | Carbon | 0.12 | 0.09 | 0.89 | 37 | — |
| 31 | Si$_3$N$_4$ | ZrO$_2$ | 0.17 | 0.18 | 0.23 | 37 | 16 |
| 32 | Si$_3$N$_4$ | ZrN | 0.20 | 0.22 | 0.23 | 37 | 30 |
| 33 | Si$_3$N$_4$ | AlN | 0.24 | 0.21 | 0.31 | 37 | 28 |
| 34 | Si$_3$N$_4$ | MgO | 0.22 | 0.16 | 0.48 | 37 | 10 |
| 35 | Si$_3$N$_4$ | B$_4$C | 0.18 | 0.31 | 0.28 | 37 | 20 |
| 36 | Si$_3$N$_4$ | UO$_2$ | 0.17 | 0.21 | 0.18 | 37 | 19 |
| 37 | Al$_2$O$_3$ | Al$_2$O$_3$ | 0.38 | 0.24 | 0.24 | 12 | 12 |
| 38 | Al$_2$O$_3$ | TiC | 0.24 | 0.24 | 0.25 | 12 | 30 |
| 39 | Al$_2$O$_3$ | SiO$_2$ | 0.23 | 0.19 | 0.48 | 12 | 19 |
| 40 | Al$_2$O$_3$ | TiO$_2$ | 0.24 | 0.21 | 0.21 | 12 | 24 |
| 41 | Al$_2$O$_3$ | Carbon | 0.10 | 0.09 | 1.17 | 12 | — |
| 42 | Al$_2$O$_3$ | ZrO$_2$ | 0.28 | 0.17 | 0.18 | 12 | 16 |
| 43 | Al$_2$O$_3$ | ZrN | 0.26 | 0.21 | 0.16 | 12 | 30 |
| 44 | Al$_2$O$_3$ | AlN | 0.21 | 0.31 | 0.34 | 12 | 28 |
| 45 | Al$_2$O$_3$ | FC-20 | 0.28 | 0.24 | 1.21 | 12 | — |
| 46 | Al$_2$O$_3$ | Carbon iron | 0.28 | 0.23 | 1.02 | 12 | — |
| 47 | Al$_2$O$_3$ | PTFE | 0.17 | 0.14 | 0.56 | 12 | — |
| 48 | ZrO$_3$ | Carbon iron | 0.27 | 0.21 | 0.98 | 16 | — |
| 49 | Product of the present invention | Product of the present invention | 0.27 | 1.71 | 1.71 | 51 | 51 |
| 50 | Product of the present invention | SiC | 0.24 | 2.95 | 0.45 | 51 | 31 |
| 51 | Product of the present invention | Si$_3$N$_4$ | 0.28 | 2.24 | 0.53 | 51 | 37 |

Sliding conditions: In machine oil at surface pressure of 2 kg/cm$^2$ and sliding speed of 2 m/sec.

EXAMPLES 205-210

The same test as in Example 146 was conducted on sintered bodies different in void content and diameter. The amount of binder was changed. The results are shown in Table 18.

Sliding conditions were surface pressure: 10 kgf/cm$^2$ and sliding speed: 1 m/sec.

From the results, it can be seen that when void content exceeds 30%, abrasion wear abruptly increases. When diameter of void is more than 100 μm, abrasion wear also increases. The products of the present invention are superior in sliding properties.

TABLE 18

| | Sliding materials | | SiC/Si$_3$N$_4$ Void content (%) | SiC/Si$_3$N$_4$ Maximum void diameter (μm) | Friction coeffi- cient | Total abrasion wear (mg/cm$^2$/ 100 h) |
|---|---|---|---|---|---|---|
| No. | (I) | (II) | | | | |
| Examples | | | | | | |
| 205 | SiC/Si$_3$N$_4$ | Al$_2$O$_3$ | 5 | 5 | 0.007 | 0.07 |
| 206 | SiC/Si$_3$N$_4$ | Al$_2$O$_3$ | 10 | 8 | 0.007 | 0.08 |
| 207 | SiC/Si$_3$N$_4$ | Al$_2$O$_3$ | 15 | 15 | 0.007 | 0.08 |
| 208 | SiC/Si$_3$N$_4$ | Al$_2$O$_3$ | 20 | 15 | 0.007 | 0.08 |
| 209 | SiC/Si$_3$N$_4$ | Al$_2$O$_3$ | 25 | 30 | 0.007 | 0.11 |
| 210 | SiC/Si$_3$N$_4$ | Al$_2$O$_3$ | 30 | 100 | 0.007 | 0.89 |
| Examples (Comparative) | | | | | | |
| 52 | SiC/Si$_3$N$_4$ | Al$_2$O$_3$ | 35 | 40 | 0.007 | 1.57 |
| 53 | SiC/Si$_3$N$_4$ | Al$_2$O$_3$ | 40 | 50 | 0.007 | 2.96 |
| 54 | SiC/Si$_3$N$_4$ | Al$_2$O$_3$ | 50 | 80 | 0.007 | 3.24 |
| 55 | SiC/Si$_3$N$_4$ | Al$_2$O$_3$ | 30 | 110 | 0.007 | 1.54 |
| 56 | SiC/Si$_3$N$_4$ | Al$_2$O$_3$ | 30 | 150 | 0.007 | 3.21 |
| 57 | SiC/Si$_3$N$_4$ | Al$_2$O$_3$ | 30 | 210 | 0.007 | Dragging |

TABLE 18-continued

| No. | Sliding materials (I) | Sliding materials (II) | SiC/Si₃N₄ Void content (%) | SiC/Si₃N₄ Maximum void diameter (μm) | Friction coefficient | Total abrasion wear (mg/cm²/ 100 h) |
| --- | --- | --- | --- | --- | --- | --- |
|  |  |  |  |  |  | for 70 h |

Sliding conditions: In machine oil at surface pressure of 10 kgf/cm² and sliding speed of 2 m/sec.

EXAMPLES 211-217

Sintered bodies were prepared in the same manner as in Example 146 except that the average particle size of SiC powder was changed. The sliding test was conducted using Al₂O₃ as the partner material. The results are shown in Table 19. When SiC particle is great, dragging occurs as result of the SiC particles which have fallen off. The products of the present invention are superior in wear resistance. Excellent sliding properties were exhibited when two or more SiC particles different in average particle size were mixed.

TABLE 19

| No. | Average particle size of SiC in SiC/Si₃N₄ (μm) | Friction coefficient | SiC/Si₃N₄ Abrasion wear (mg/cm²/ 100 h) | Al₂O₃ Abrasion wear (mg/cm²/ 100 h) | SiC/Si₃N₄ Thermal shock resistance (times) |
| --- | --- | --- | --- | --- | --- |
| Examples |  |  |  |  |  |
| 211 | 0.5 | 0.08 | 0.02 | 0.03 | 50 |
| 212 | 2 | 0.08 | 0.03 | 0.03 | 51 |
| 213 | 10 | 0.07 | 0.03 | 0.04 | 51 |
| 214 | 50 | 0.07 | 0.04 | 0.07 | 51 |
| 215 | 72 | 0.07 | 0.07 | 0.12 | 52 |
| 216 | 85 | 0.07 | 0.09 | 0.17 | 52 |
| 217 | 100 | 0.07 | 0.10 | 0.22 | 51 |
| Examples (Comparative |  |  |  |  |  |
| 58 | 120 | 0.07 | 0.22 | 1.08 | 51 |
| 59 | 240 | 0.07 | 0.44 | 1.54 | 51 |
| 60 | 400 | 0.07 | 0.81 | 2.12 | 51 |
| 61 | 800 | 0.07 | 1.23 | 5.23 | 51 |

Sliding conditions: Surface pressure 10 kgf/cm² and sliding speed 5 m/sec. in SUNISO 4GS oil (made by Nippon Sun Sekyu K.K.)

EXAMPLES 218-220

60 parts by weight of metallic Si powder of 1 μm in average particle size and 40 parts by weight of β-Sic powder of 8 μm in average particle size were mixed together with an organosilicone high polymer and xylene as a binder in a pot mill and dried. The mixture was molded to a ring of 150 mm outer diameter, 100 mm inner diameter and 20 mm thick at 100° C. and under 2000 kgf/cm². The molded body was heated stepwise to 1400° C. over a long period of time in nitrogen and ammonia mixed atmosphere. Void content of sintered bodies was 10% and void diameter was 10 μm or less. Sliding test was conducted in the same manner as Example 146 and the results are shown in Table 20. From the results, it can be seen that the products of the present invention are superior in sliding properties.

TABLE 20

| No. | Organo Si high polymer compound (part by weight) | Partner material | Friction coefficient | SiC/Si₃N₄ Abrasion wear (mg/cm²/ 100 h) | Abrasion wear of partner material (mg/cm² /100 h) |
| --- | --- | --- | --- | --- | --- |
| Examples |  |  |  |  |  |
| 218 | siliconimide MW: 1500 (15) | Al₂O₃ | 0.007 | 0.02 | 0.03 |
| 219 | Polysilane MW: 500 (10) | Al₂O₃ | 0.007 | 0.02 | 0.03 |
| 220 | Polysil MW: 800 (12) | Al₂O₃ | 0.007 | 0.02 | 0.03 |

Sliding condition: Surface pressure 10 kgf/cm² and sliding speed 5 m/sec. in SUNISO 4GS oil.

EXAMPLES 221-229

Sintered bodies were prepared in the same manner as in Example 146 except that the raw material ratio of metallic Si and SiC was changed in order to change the ratio of Si₃N₄ phase slid SiC phase in the sintered bodies. Results of sliding test on these sintered bodies are shown in Table 21. The sliding conditions were same as in Example 210.

From the results, it can be seen that with an increase in the amount of SiC particle, the mechanical strength decreases. This results in an increase in abrasion wear. Therefore, it is preferred that the amount of SiC particle is 70 vol % or less. Considering thermal shock resistance, SiC particle is contained in an amount of at least 20 vol %.

Therefore, it is seen that reaction-bonded material of the present invention where SiC particles are bonded with Si₃N₄ is superior to the material comprising only Si₃N₄ or SiC in thermal shock resistance.

As comparative examples, the same tests were conducted on porous reaction-sintered $Si_3N_4$ body and SiC body. The results are also shown in Table 21.

TABLE 21

| No. | Composition of sintered body $Si_3N_4$ | SiC | Partner material | Friction coefficient | $Si_3N_4$/SiC Abrasion wear (mg/cm$^2$/ 100 h) | Abrasion wear of partner material (mg/cm$^2$/ 100 h) | $Si_3N_4$/SiC Thermal shock resistance (times) |
|---|---|---|---|---|---|---|---|
| Examples | | | | | | | |
| 221 | 95 | 5 | $Al_2O_3$ | 0.022 | 0.38 | 0.24 | 37 |
| 222 | 90 | 10 | $Al_2O_3$ | 0.019 | 0.18 | 0.09 | 42 |
| 223 | 80 | 20 | $Al_2O_3$ | 0.008 | 0.04 | 0.04 | 50 |
| 224 | 70 | 30 | $Al_2O_3$ | 0.007 | 0.04 | 0.03 | 51 |
| 225 | 50 | 50 | $Al_2O_3$ | 0.007 | 0.04 | 0.03 | 52 |
| 226 | 40 | 60 | $Al_2O_3$ | 0.008 | 0.05 | 0.05 | 52 |
| 227 | 30 | 70 | $Al_2O_3$ | 0.009 | 0.09 | 0.15 | 51 |
| 228 | 20 | 80 | $Al_2O_3$ | 0.012 | 0.15 | 0.48 | 43 |
| 229 | 10 | 90 | $Al_2O_3$ | 0.057 | 0.34 | 0.89 | 40 |
| Comparative Examples | | | | | | | |
| 62 | 100 | — | $Al_2O_3$ | 0.101 | Reaction sintering 2.10 | 1.24 | 20 |
| 63 | — | 100 | $Al_2O_3$ | 0.120 | Reaction sintering 1.54 | 3.24 | 34 |

Sliding condition: Surface pressure of 12 kgf/cm$^2$ and sliding speed of 5 m/sec. in SUNISO 4GS oil.

EXAMPLE 230

13 Parts by weight of a mixture of polyethylene, stearic acid and a synthetic wax were added to 60 parts by weight of metallic Si powder of 0.5 μm in average particle size and 40 parts by weight of SiC powder of 10 μm in average particle size. The mixture was kneaded. This raw material was injection molded into a floating seal as shown by reference number 7 in FIG. 18. After removal of the wax in the molded body, this was heated from 1100° C.-1400°0 C. at 6° C./h in nitrogen atmosphere. The dimensional change of the floating seal on sintering was small, namely, 0.13%. This was able to be used only by finishing a sliding surface. Therefore, it is considered that variability in dimension of bodies can be inhibited and working cost can be reduced to half. Thus, the bodies are suitable for mass production. Results of sliding tests are shown in Table 22.

TABLE 22

| No. | Combination of sliding material (I) | (II) | Friction coefficient | Total abrasion wear (mg/cm$^2$/ 100 h) | Abrasion wear (mg/cm$^2$/ 100 h) |
|---|---|---|---|---|---|
| Example 230 | $Si_3N_4$/ SiC | Cr cast iron | 0.007 | 0.02 | 0.22 |

Sliding conditions: Surface pressure 8 kgf/cm$^2$ and sliding speed 3 m/sec. in SUNISO 4GS oil.

EXAMPLE 231

The sintered body obtained in Example 146 was subjected to HIP treatment at 2000° C. for 4 hours under 80 art in nitrogen atmosphere. Test results on the resulting sintered body are shown in Table 23.

TABLE 23

| No. | Sintered body after HIP treatment (I) Void content (%) | Thermal shock resistance (times) | Partner material (II) | Friction coefficient | (I) Abrasion wear (mg/cm$^2$/ 100 h) | (II) Abrasion wear (mg/cm$^2$/ 100 h) |
|---|---|---|---|---|---|---|
| Example 231 | 2 | 53 | $Al_2O_3$ | 0.007 | 0.01 | 0.02 |

Sliding condition: Surface pressure 10 kgf/cm$^2$ and sliding speed 7 m/sec. in SUNISO 4GS oil.

EXAMPLE 232

A furan resin was impregnated into the voids of the sintered body obtained In Example 146. This was accomplished by autoclave in order to reduce open void content. Test results on the resulting sintered body are shown in Table 24.

TABLE 24

| No. | Furan resin impregnated product (I) Void content | Partner material (II) | Friction coefficient | (I) Abrasion wear (mg/cm$^2$/ 100 h) | (II) Abrasion wear (mg/cm$^2$ 100 h) |
|---|---|---|---|---|---|
| Example 232 | 7 | $Al_2O_3$ | 0.005 | 0.001 | 0.002 |

Sliding condition: Surface pressure 10 kgf/cm$^2$ and sliding speed 7 m/sec. in SUNISO 4GS oil.

EXAMPLES 233–240

Sintered bodies were made in the same manner as in Example 146 except that SiC whisker as shown in Table 25 was used in place of α-SiC particle. Sliding test results on the resulting sintered bodies are shown in Table 25, wherein the average aspect ratio of whisker is indicated by A and average length by L.

TABLE 25

| No. | SiC Whisker (I) | Partner material (II) | Friction coefficient | (I) Abrasion wear (mg/cm²/ 100 h) | (II) Abrasion wear (mg/cm²/ 100 h) |
|---|---|---|---|---|---|
| Examples | | | | | |
| 233 | A = 50 L = 10 μm | Al₂O₃ | 0.007 | 0.01 | 0.02 |
| 234 | A = 100 L = 50 μm | Al₂O₃ | 0.007 | 0.01 | 0.02 |
| 235 | A = 200 L = 35 μm | Al₂O₃ | 0.007 | 0.03 | 0.05 |
| 236 | A = 100 L = 100 μm | Al₂O₃ | 0.007 | 0.03 | 0.04 |
| 237 | A = 60 L = 200 μm | Al₂O₃ | 0.007 | 0.09 | 0.11 |
| 238 | A = 50 L = 250 μm | Al₂O₃ | 0.007 | 0.10 | 0.23 |
| 239 | A = 210 L = 100 μm | Al₂O₃ | 0.007 | 0.15 | 0.26 |
| 240 | A = 220 L = 350 μm | Al₂O₃ | 0.007 | 0.25 | 0.56 |

Sliding conditions: Surface pressure 10 kgf/cm² and sliding speed 7 m/sec. in SUNISO 4GS oil.

EXAMPLE 241

Figure 18:
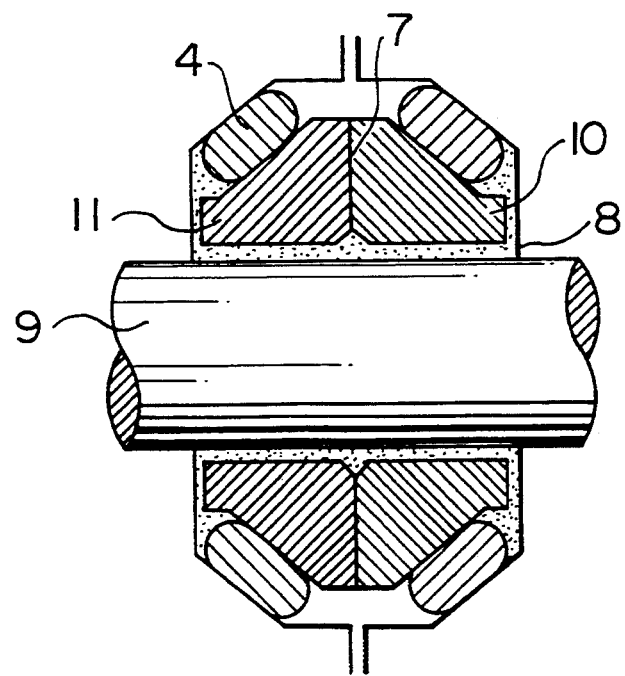
FIG. 18 is also a cross-sectional view of another example of a floating seal.

The raw material obtained in Example 146 was injection molded into a floating seal as shown in FIG. 18. This molded body was impregnated with a furan resin using an autoclave in the same manner as in Example 232. As a partner material, a floating seal as shown In FIG. 18 was made by injection molding of Al₂O₃ (relative density 98%). They were incorporated into rolling wheel of a caterpillar rotating axis of a construction machine and actual working test was conducted. After 500 hours test, overhaul thereof was carried out to find no hydraulic leakage or sliding marks.

What is claimed is:

1. A method for producing a ceramic composite, comprising the steps of:
   preparing a first mixture including a first powder of an electrically conductive ceramic material, Si powder and a binder;
   kneading the first mixture to form a first kneaded product;
   preparing a second mixture including a second powder of an electrically insulating ceramic material selected from the group consisting of Al₂O₃, Si₂N₂O, Si₃N₄ and ZrO₂; Si powder and a binder;
   kneading the second mixture to form a second kneaded product;
   combining the first and second kneaded products to form a composite body by direct bonding;
   removing the binder from the composite body; and
   sintering the composite body in a nitrogen atmosphere to effect a reaction between the Si powder and nitrogen so as to form particles and whiskers of silicon nitride in the sintered composite body.

2. A method for producing a ceramic composite, as set forth in claim 1, wherein the ceramic composite formed according to the method consists essentially of:
   a first zone including electrically conductive ceramic grains, and particles and whiskers comprised of at least one material selected from the group consisting of Si₃N₄, Si₂N₂O and SiO₂;
   a second zone contiguous with said first zone and including electrically insulating ceramic grains, and particles and whiskers comprised of at least one material selected from the group consisting of Si₃N₄, Si₂N₂O and SiO₂, wherein said particles and whiskers are reaction products produced upon sintering metallic silicon in a nitrogen-containing atmosphere, and said first and second zones are bonded together by said particles and whiskers.

3. A method for producing a ceramic composite, as set forth in claim 2, wherein the ratio of the whiskers to the conductive and insulating ceramic grains is in the range of about 1/99 to 70/30.

4. A method for producing a ceramic composite, as set forth in claim 3, wherein the ratio of the whiskers to the conductive and insulating ceramic grains is in the range of about 10/90 to 30/70.

5. A method for producing a ceramic composite, as set forth in claim 2, wherein the ceramic composite defines a void content in the range of about 5–40%.

6. A method for producing a ceramic composite, as set forth in claim 1, wherein the electrically conductive ceramic materials are selected from the group consisting of TiN, TiC, TiB₂, TiSi₂, ZrN, ZrC, ZrB₂, ZrSi₂, HfN, HfC, TaN, TaC, TaB₂, TaSi₂, Mo₂N, Mo₂C, MoB, Cr₂N, Cr₃C₂, CrB, CrSi₂, NbN, NbC, NbSi₂, VN, VC, WC, and WSi₂.

7. A method for producing a ceramic of high dimensional accuracy, comprising the steps of:
   heating and kneading a mixture of Si powders or powders of an inorganic compound containing at least 45 volume % of the metallic Si, and a binder comprising a thermoplastic resin;
   subjecting the kneaded product to warm pressure molding to produce a molded body of at least 70 volume % in volumetric powder packing;
   removing the binder from the molded body; and
   heating and sintering the molded body in a nitriding gas atmosphere to effect a reaction between the Si and nitrogen so as to form particles and whiskers of silicon nitride in the sintered composite body.

8. A method for producing a ceramic of high dimensional accuracy, comprising the steps of:
   heating and kneading a mixture of metallic Si powders or powders of an inorganic compound containing at least 45 volume % of metallic Si powders and a binder comprising a thermoplastic resin to form a kneaded product, the amount of binder present corresponding to the formula B=[(7S/20,000) +3]+2.5, with B representing the amount of binder per 100 parts by weight of raw material powder composition, and S representing a specific surface area in cm² per gram of raw material powders;
   subjecting the kneaded product to warm pressure molding to produce a molded body of at least 70 volume % in volumetric powder packing;
   heating the molded body to remove the binder therefrom; and
   heating and sintering the molded body in a nitriding gas atmosphere to effect a reaction between the Si and nitrogen so as to form particles and whiskers of silicon nitride and the sintered composite body.

9. A method for producing a ceramic composite, comprising the steps of:
   preparing a first mixture including a first powder of an electrically conductive ceramic material, Si powder and a binder;

kneading the first mixture to form a first kneaded product;

preparing a second mixture including a second powder of an electrically insulating ceramic material selected from the group consisting of $Al_2O_3$, $Si_2N_2O$, $Si_3N_4$ and $ZrO_2$; Si powder and a binder;

kneading the second mixture to form a second kneaded product;

combining the first and second kneaded products to form a composite body by direct bonding;

removing the binder from the composite body; and sintering the composite body in a nitrogen atmosphere to effect a reaction between the Si powder and nitrogen so as to form particles and whiskers of silicon nitride in the sintered composite body with the sintered composite body consisting essentially of:

a first zone including electrically conductive ceramic grains, and particles and whiskers comprised of at least one material selected from the group consisting of $Si_3N_4$, $Si_2N_2O$, and $SiO_2$; and a second zone contiguous with said first zone and including electrically insulating ceramic grains and particles and whiskers comprised of at least one material selected from the group consisting of $Si_3N_4$, $Si_2N_2O$ and $SiO_2$, wherein said particles and whiskers are reaction products produced upon sintering metallic silicon in a nitrogen-containing atmosphere and said first and second zones are bonded together by said particles and whiskers.

10. A method for producing a ceramic composite, as set forth in claim 9, wherein the first zone includes electrically conductive ceramic grains selected from the group consisting of TiN, TiC, $TiB_2$, $TiSi_2$, ZrN, ZrC, $ZrB_2$, $ZrSi_2$, HfN, HfC, TaN, TaC, $TaB_2$, $TaSi_2$, $Mo_2N$, $Mo_2C$, MoB, $Cr_2N$, $Cr_3C_2$, CrB, $CrSi_2$, NbN, NbC, $NbSi_2$, VN, VC, WC, and $WSi_2$.

11. A method for producing a ceramic composite, as set forth in claim 9, wherein the ceramic composite defines a void content in the range of 5–40%.

12. A method for producing a ceramic composite, as set forth in claim 9, wherein the ratio of the whiskers to the conductive and insulating ceramic grains is in the range of 1/99 to 70/30.

13. A method for producing a ceramic composite, as set forth in claim 9, wherein the ratio of the whiskers to the conductive and insulating ceramic grains is in the range of about 10/90 to 30/70.

* * * * *